US007239789B2

(12) United States Patent
Grubish et al.

(10) Patent No.: US 7,239,789 B2
(45) Date of Patent: Jul. 3, 2007

(54) OPTICAL FIBER SPLICE CASE

(75) Inventors: Christopher Grubish, Solon, OH (US); Keith A. Miller, Twinsburg, OH (US); Robert Whapham, North Royalton, OH (US); Luke Witgen, Colleyville, TX (US); John Hofstetter, Brunswick, OH (US)

(73) Assignee: Preformed Line Products Company, Cleveland, OH (US)

( * ) Notice: Subject to any disclaimer, the term of this patent is extended or adjusted under 35 U.S.C. 154(b) by 0 days.

(21) Appl. No.: 11/245,151

(22) Filed: Oct. 6, 2005

(65) Prior Publication Data

US 2006/0083475 A1    Apr. 20, 2006

Related U.S. Application Data

(60) Provisional application No. 60/616,310, filed on Oct. 6, 2004, provisional application No. 60/508,962, filed on Oct. 6, 2003.

(51) Int. Cl.
*G02B 6/00* (2006.01)
(52) U.S. Cl. .................................... 385/135
(58) Field of Classification Search ................ 385/135
See application file for complete search history.

(56) References Cited

U.S. PATENT DOCUMENTS

| 4,039,742 A | 8/1977 | Smith |
| 4,092,019 A | 5/1978 | Young |
| 4,181,814 A | 1/1980 | Smith |
| 4,266,853 A | 5/1981 | Hutchins et al. |
| 4,314,094 A | 2/1982 | Smith |
| 4,319,951 A | 3/1982 | Korbelak et al. |
| 4,332,435 A | 6/1982 | Post |
| 4,359,262 A | 11/1982 | Dolan |
| 4,373,776 A | 2/1983 | Purdy |
| 4,418,982 A | 12/1983 | Williams |
| 4,424,412 A | 1/1984 | Goetter et al. |
| 4,428,645 A | 1/1984 | Korbelak et al. |
| 4,500,166 A | 2/1985 | Kunze |
| 4,549,040 A | 10/1985 | Goetter |
| 4,558,174 A | 12/1985 | Massey |
| 4,619,499 A | 10/1986 | Gerber |
| 4,620,815 A | 11/1986 | Goetter |
| 4,666,240 A | 5/1987 | Caron et al. |
| 4,679,896 A | 7/1987 | Krafcik et al. |
| 4,687,289 A | 8/1987 | DeSanti |
| 4,733,019 A | 3/1988 | Pichler et al. |
| 4,743,209 A | 5/1988 | Gittle |

(Continued)

FOREIGN PATENT DOCUMENTS

CA    1108904    9/1981

(Continued)

*Primary Examiner*—Ellen E. Kim
(74) *Attorney, Agent, or Firm*—Fay Sharpe LLP

(57) ABSTRACT

An optical fiber splice case particularly adapted for providing fiber optic links directly to a home, business, et al. is provided wherein an enclosure base has a dividing wall defining a drop chamber on a first side of the wall and a splicing chamber on a second side of the wall. A first and a second cover member is selectively sealingly engaged with opposing sides of the enclosure base. The enclosure base includes a bulkhead member having a plurality of optical fiber ports therethrough.

22 Claims, 19 Drawing Sheets

U.S. PATENT DOCUMENTS

| | | |
|---|---|---|
| 4,799,757 A | 1/1989 | Goetter |
| 4,805,979 A | 2/1989 | Bossard et al. |
| 4,808,772 A | 2/1989 | Pichler et al. |
| 4,861,134 A * | 8/1989 | Alameel et al. ............ 385/135 |
| 4,913,522 A | 4/1990 | Nolf et al. |
| 4,927,227 A | 5/1990 | Bensel, III et al. |
| 5,042,901 A | 8/1991 | Merriken et al. |
| 5,093,885 A | 3/1992 | Anton |
| 5,131,066 A | 7/1992 | Foss |
| 5,155,794 A | 10/1992 | Nolf et al. |
| 5,185,845 A | 2/1993 | Jones |
| 5,245,133 A | 9/1993 | DeCarlo et al. |
| 5,249,252 A | 9/1993 | Noto |
| 5,249,253 A | 9/1993 | Franckx et al. |
| 5,261,024 A | 11/1993 | Allen et al. |
| 5,278,933 A | 1/1994 | Hunsinger et al. |
| 5,285,515 A | 2/1994 | Milanowski et al. |
| 5,315,683 A | 5/1994 | Miller |
| 5,323,478 A | 6/1994 | Milanowski et al. |
| 5,323,480 A | 6/1994 | Mullaney et al. |
| 5,363,466 A | 11/1994 | Milanowski et al. |
| 5,402,515 A | 3/1995 | Vidacovich et al. |
| RE34,955 E | 5/1995 | Anton et al. |
| 5,446,823 A | 8/1995 | Bingham et al. |
| 5,450,518 A | 9/1995 | Burek et al. |
| 5,461,693 A | 10/1995 | Pimpinella |
| 5,479,553 A | 12/1995 | Daems et al. |
| 5,490,229 A | 2/1996 | Ghandeharizadeh |
| 5,509,099 A * | 4/1996 | Hermsen et al. ............ 385/134 |
| 5,602,954 A | 2/1997 | Nolf et al. |
| 5,631,993 A * | 5/1997 | Cloud et al. ................ 385/135 |
| 5,644,671 A * | 7/1997 | Goetter et al. ............... 385/135 |
| 5,647,045 A * | 7/1997 | Robinson et al. ........... 385/135 |
| 5,692,299 A | 12/1997 | Daems et al. |
| 5,733,019 A | 3/1998 | Inagaki et al. |
| 5,734,774 A | 3/1998 | Morrell |
| 5,790,740 A | 8/1998 | Cloud |
| 5,793,921 A | 8/1998 | Wilkins et al. |
| 5,825,964 A | 10/1998 | Goetter et al. |
| 5,883,999 A | 3/1999 | Cloud |
| 5,884,000 A | 3/1999 | Cloud et al. |
| 5,892,870 A | 4/1999 | Fingler et al. |
| 5,896,486 A | 4/1999 | Burek et al. |
| 5,917,984 A | 6/1999 | Roseler et al. |
| 6,009,224 A | 12/1999 | Allen |
| 6,044,193 A | 3/2000 | Szentesi et al. |
| 6,201,921 B1 | 3/2001 | Quesnel et al. |
| 6,215,939 B1 | 4/2001 | Cloud |
| 6,226,434 B1 * | 5/2001 | Koshiyama et al. ........ 385/134 |
| 6,385,381 B1 | 5/2002 | Janus et al. |
| 6,418,266 B1 | 7/2002 | Vitantonio |
| 6,621,975 B2 | 9/2003 | Laporte et al. |
| 6,766,094 B2 * | 7/2004 | Smith et al. ................. 385/135 |
| 7,130,519 B2 | 10/2006 | Grubish |
| 2003/0091315 A1* | 5/2003 | Allerellie .................... 385/135 |
| 2003/0103750 A1* | 6/2003 | Laporte et al. ............. 385/134 |
| 2003/0211778 A1 | 11/2003 | Burris et al. |
| 2005/0123261 A1* | 6/2005 | Bellekens et al. .......... 385/135 |
| 2005/0163448 A1 | 7/2005 | Blackwell et al. |
| 2005/0175307 A1 | 8/2005 | Battey et al. |
| 2006/0083475 A1 | 4/2006 | Grubish |

FOREIGN PATENT DOCUMENTS

| | | |
|---|---|---|
| DE | 3248003 | 6/1984 |
| EP | 0043570 | 1/1982 |
| EP | 0159857 | 10/1985 |
| GB | 2113865 | 8/1983 |
| JP | 57-109912 | 7/1982 |
| JP | 59-74517 | 4/1984 |
| JP | 59/74523 | 4/1984 |
| JP | 58-109708 | 7/1993 |
| WO | WO 82-02254 | 7/1982 |
| WO | WO 94-23324 | 10/1994 |

* cited by examiner

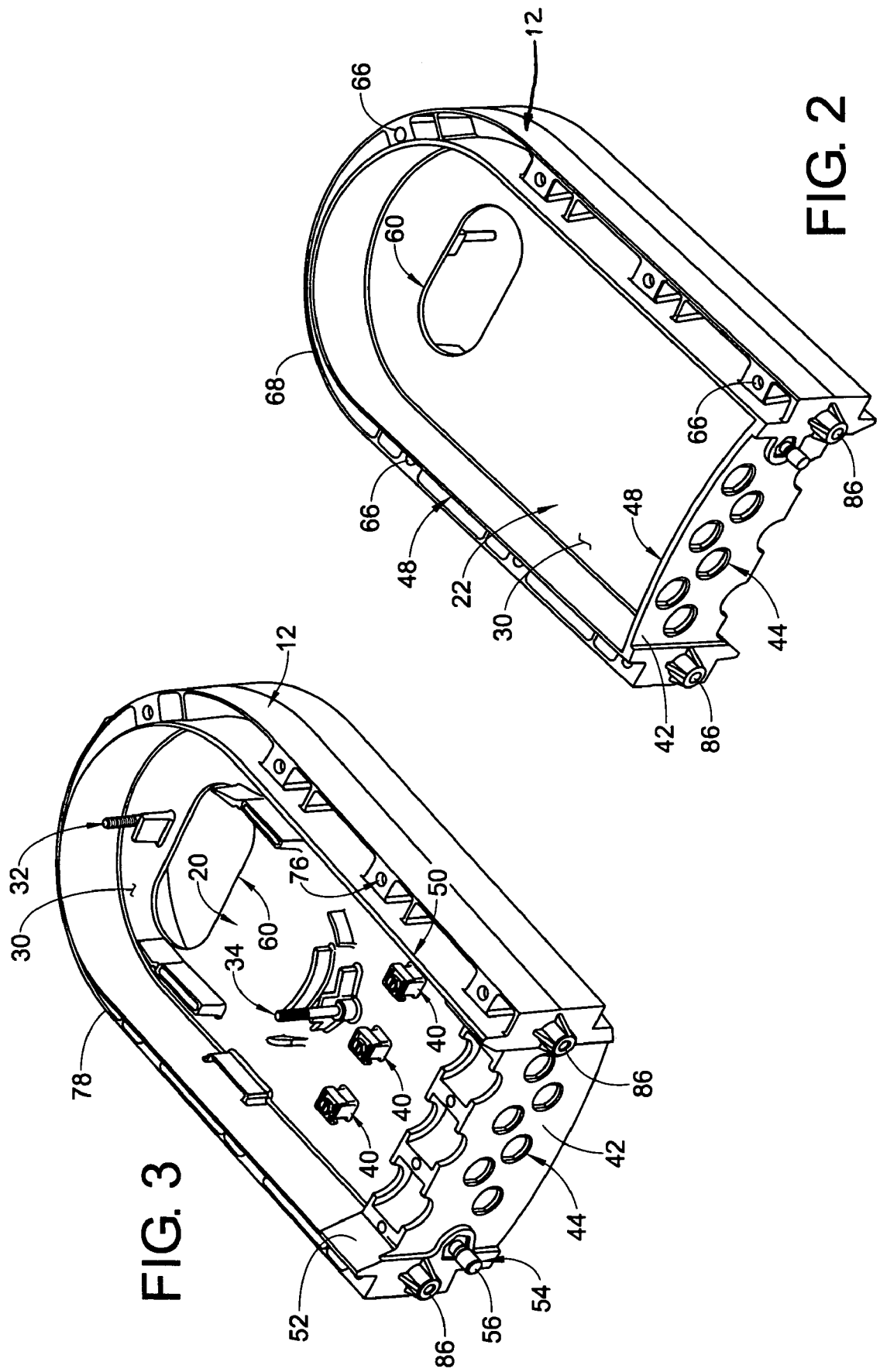

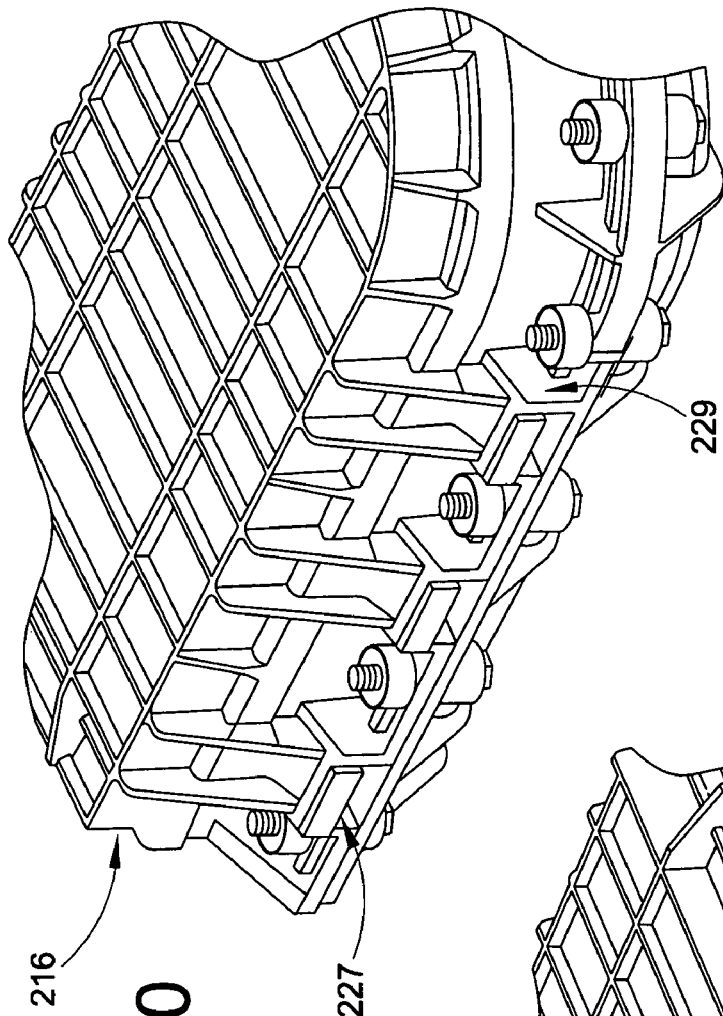
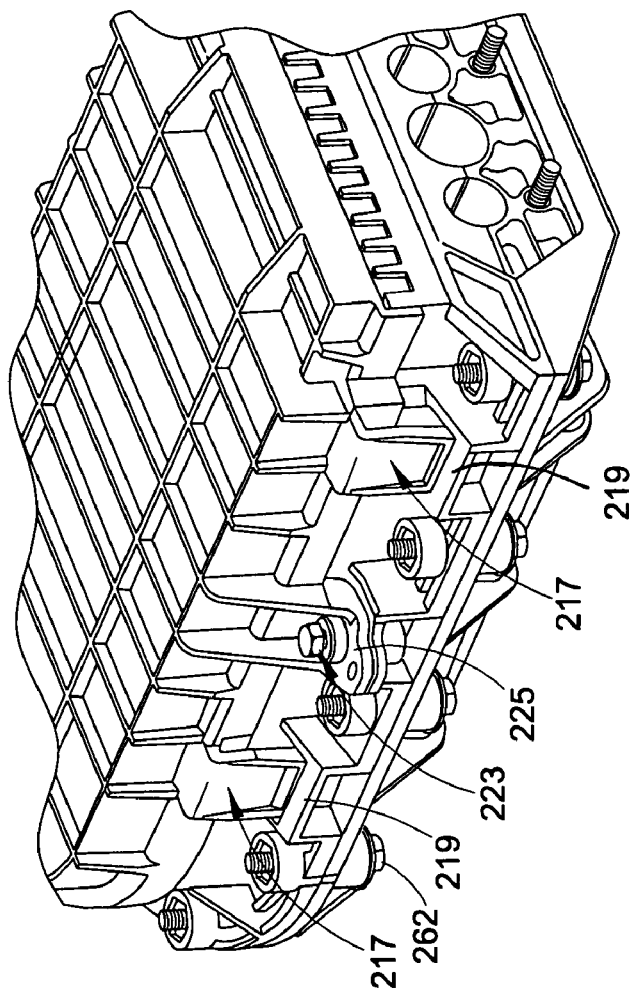

OPTICAL FIBER SPLICE CASE

This application claims the benefit of U.S. Provisional Application Ser. No. 60/616,310 filed Oct. 6, 2004 which in turn claims the benefit of U.S. Provisional Application Ser. No. 60/508,962, filed Oct. 6, 2003.

CROSS REFERENCE TO RELATED PATENTS AND APPLICATIONS

The present application is related to U.S. patent application Ser. No. 11/126,740 filed May 11, 2005 entitled Convertible Fiber Closure Platform which in turn claims the benefit of U.S. Provisional Application Ser. No. 60/569,910 filed May 11, 2004, the disclosures of which are incorporated herein by reference in their entirety.

BACKGROUND OF THE INVENTION

The subject invention is directed to a waterproof and airtight cable splice enclosure assembly. Assemblies of the type under consideration are particularly suited for enclosing and housing fiber optic cables such as loose buffer and unitube type cables and will be described with particular reference thereto. However, the apparatus could equally well be used with other types of cables or wires such as, for example, hybrid cables including copper wire, twisted pair wire or co-axial cables.

Many different types of fiber optic cable enclosures are known in the prior art. These prior enclosures are satisfactory to a greater or lesser degree but often have certain defects which make them inconvenient to use or prevent them from being readily adaptable to changing environments and conditions. One example of an optical fiber splice case that presents a significant improvement over the earlier devices found in the prior art is taught in U.S. Pat. No. 6,215,939, the teachings of which are incorporated herein by reference. Many of the features described in the patent identified above are incorporated in the novel device described herein to a greater or lesser extent and either directly or by equivalent structure. However, in addition to providing improvements over the various prior art devices, the subject optical fiber splice case presents further significant improvements over the earlier apparatus as case presents further significant improvements over the earlier apparatus as well.

Service providers (i.e. communication companies) are providing fiber optic links directly to a home, business, apartment, and even the farm. In order for service providers to keep their infrastructure costs low, a terminal enclosure must be provided to allow for ease of initial installation into service, and time savings for adding (linking) individual subscribers. Adding an individual subscriber is commonly referred to as a drop. Adding a drop in existing enclosure designs requires splicing on the fiber tray. This is achieved by removing an enclosure from its location and taking it into a temperature controlled environment. Highly skilled personnel then reenter the enclosure and use laser splicing equipment to add the new service (drop). While performing these tasks, any signals passing through the enclosure have the potential to be disturbed. This operation also requires the critical seals of the enclosure to be effected each time new service is added.

SUMMARY OF THE INVENTION

In accordance with one aspect of the invention, there is provided an optical fiber splice case including an enclosure base having a dividing wall defining a drop chamber on a first side of the wall and a splicing chamber on a second side of the wall. A first and a second cover member is selectively sealingly engaged with opposing sides of the enclosure base. The enclosure base includes a bulkhead member having a plurality of optical fiber ports therethrough.

In accordance with another aspect of the invention, an optical fiber splice case is provided including an enclosure base having a dividing wall with a splicing tray attached thereto. The enclosure base further includes an adapter bulkhead member having a plurality of optical fiber ports adapted to selectively sealingly receive drop wires. Each of the drop wires is connected to a fiber connector. The fiber connector and the splicing tray include a fiber jumper therebetween.

In accordance with still a further aspect of the invention, a method is provided for connecting an optical fiber to a plurality of end users including the steps of, providing an optical fiber splice case having a selectively sealable cover member for accessing a splicing chamber and an end plate, providing the splice case with a bulkhead having a plurality of optical fiber ports therethrough, opening the cover member and installing a feeder cable between the end plate and the bulkhead in the splicing chamber, connecting the feeder cable to a selected number of fiber jumpers, connecting the selected number of fiber jumpers to a selected number of fiber connectors, and attaching a selected number of drop wires to the selected number of fiber connectors.

In accordance with still a further aspect of the invention, a method is provided for making an optical fiber splice case including the steps of, providing a double sided enclosure base having two chambers and a splicing tray in one of the chambers, providing an end plate and an adapter bulkhead with a plurality of fiber adapters and a plurality of fiber cable ports, the fiber adapters can include fiber connectors, connecting the fiber connectors, on one side of the bulkhead, with the splicing tray via a plurality of fiber jumpers, installing a plurality of dust covers, on the other side of the bulkhead, to the fiber adapters, and finally, enclosing and sealing the chambers with a pair of cover members selectively sealingly engaged with the end plate, the bulkhead, and the enclosure base.

In accordance with yet still another aspect of the invention, an optical fiber splice case is provided including an enclosure base having a dividing wall with a splicing tray on one side attached thereto. The dividing wall has, on the other side, a connector plate attached thereto. The connector plate and the splicing tray include a fiber jumper therebetween. The enclosure base further includes a bulkhead member having a plurality of fiber ports therethrough adapted to receive a plurality of fiber drops. The connector plate includes a plurality of fiber connectors adapted to receive a terminal end of the fiber drops.

Other advantages and benefits of the invention will become apparent to those skilled in the art upon a reading and understanding of the following detailed description.

BRIEF DESCRIPTION OF THE DRAWINGS

The invention may take physical form in certain parts and arrangement of parts, exemplary embodiments of which will be described in detail in this specification and illustrated in the accompanying drawings which form a part hereof, and wherein:

FIG. 2 is a top perspective view of a base assembly according to the first embodiment of the housing assembly of FIG. 1;

FIG. 3 is a bottom perspective view of a base assembly according to the first embodiment of the housing assembly of FIG. 1;

FIG. 19 is an enlarged partial bottom perspective view illustrating locking tabs for the housing according to the second embodiment;

FIG. 20 is an enlarged partial bottom perspective view illustrating pivot hooks and pins for the housing according to the second embodiment;

DETAILED DESCRIPTION OF EXEMPLARY EMBODIMENTS

Figure 1:
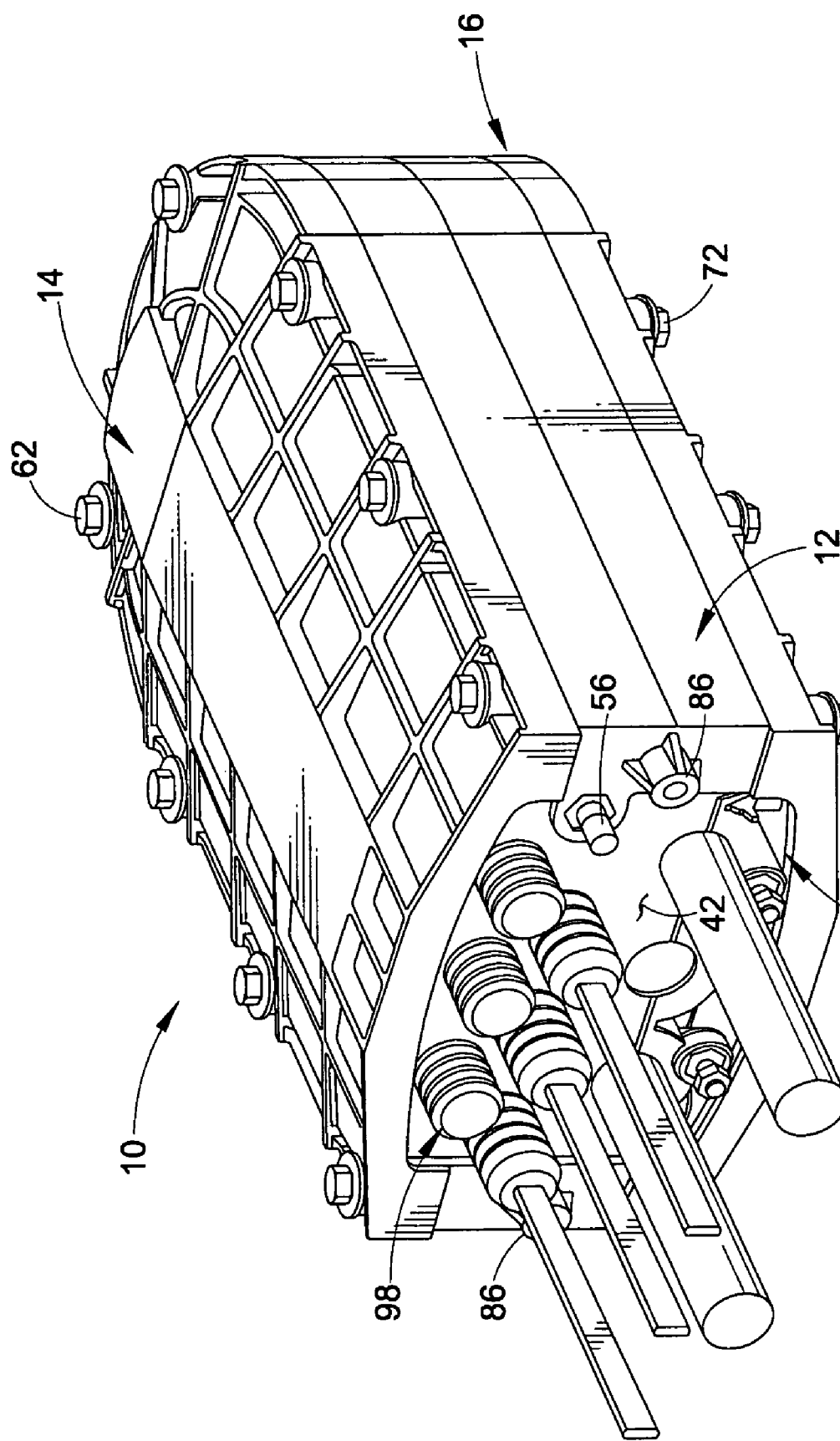
FIG. 1 shows a perspective view of a first embodiment of a housing assembly intended for use with fiber optic cable.

Referring now to the drawings wherein the showings are for the purposes of illustrating exemplary embodiments of the invention only and not for purposes of limiting same, the overall construction of the subject optical fiber splice case (housing) assembly 10 can best be understood by reference to FIGS. 1 through 5. As illustrated therein, the splice case assembly 10 comprises an enclosure base 12, enclosure covers 14, 16, and an end plate 18 that houses and encloses a splice chamber or splice tray support area 20 and a drop chamber or fiber jumper storage compartment 22 as shown. The housing assembly 10 formed by the pair of cover members 14, 16, enclosure base 12, and the end plate 18 are joined together in a sealed clamping relationship to define a flat truncated oval-shaped splice case and volume area therein (FIG. 1).

FIG. 1 displays the splice case assembly 10. The central element of the assembly 10 is the enclosure base 12. The enclosure base 12 is a double-sided element which creates two distinct secure chambers 20, 22 (FIGS. 2 and 3) with a dividing wall 30 therebetween. FIG. 2 displays the drop chamber 22 and FIG. 3 displays the splice chamber 20. The splice chamber 20 incorporates a pair of posts 32, 34 mounted to and projecting from the dividing wall 30 to allow for the installation of a splicing tray 36 to be described in more detail hereinafter. A series of tie-down brackets 40 can also be attached to the dividing wall 30 at which strength members from incoming cables (not shown) can be tied down to prevent the incoming cables from pulling out. The enclosure base 12 includes an adapter bulkhead 42 with a plurality of fiber adapter ports 44 therethrough. Each side of the enclosure base 12 includes a perimeter with a perimeter seal ring 48, 50. The perimeter is preferably in the form of an outer flange portion extending around the enclosure base. The adapter bulkhead 42 can include an end plate sealing area 52 along one side. The bulkhead 42 also includes an air valve port 54 with an air valve 56 therethrough (FIG. 3). The dividing wall 30 includes an access port 60 therethrough providing a passageway between the splicing chamber 20 and the drop chamber 22.

Figure 4:
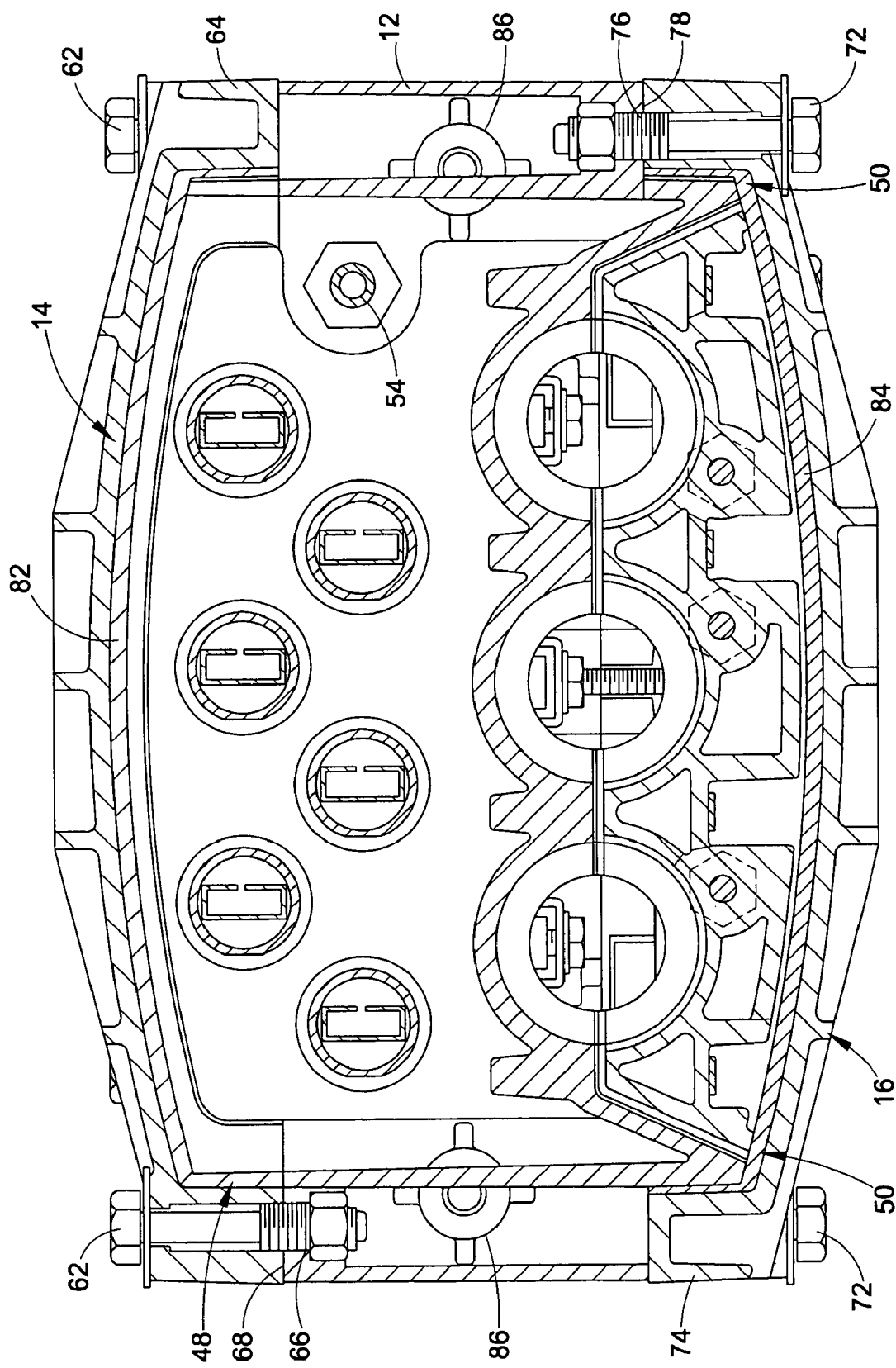
FIG. 4 is an enlarged cross-sectional view taken along line 4-4 of FIG. 1 illustrating closure covers and seals against the base assembly.
Figure 5:
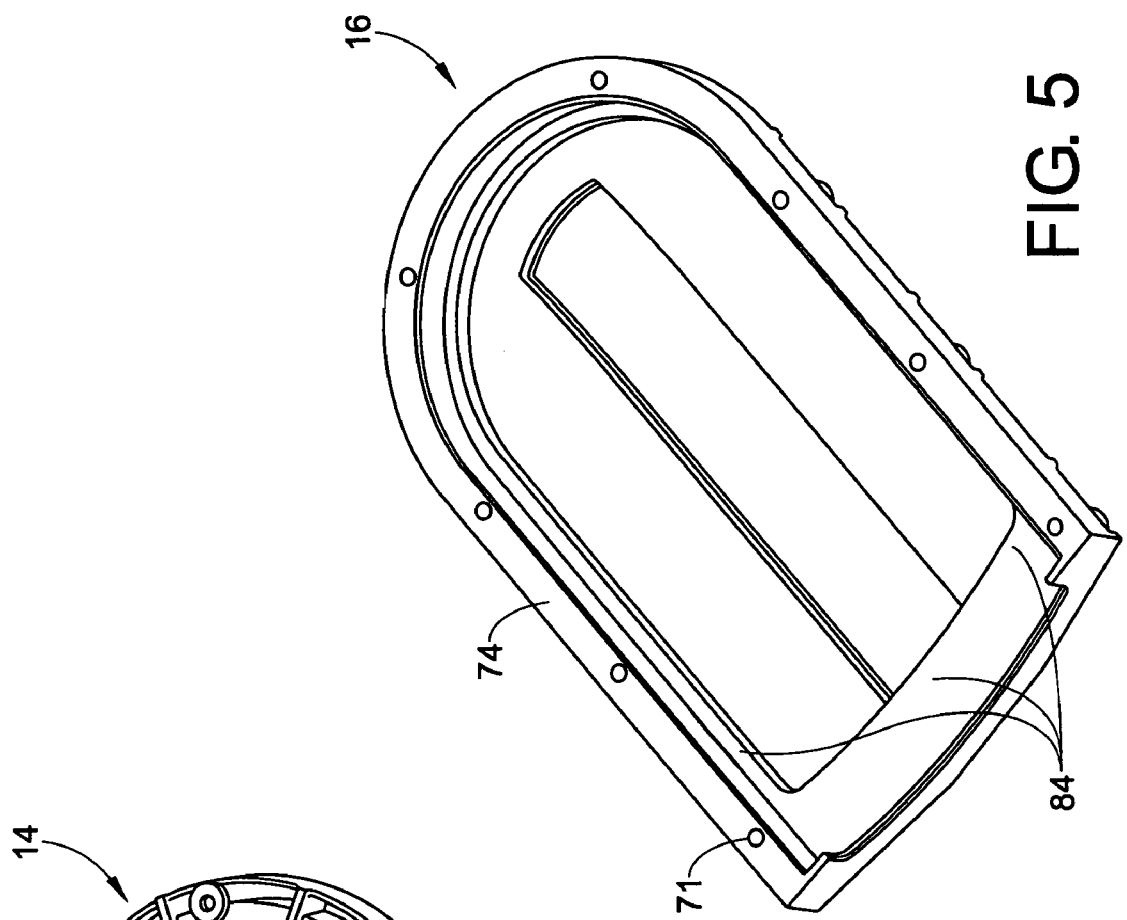
FIG. 5 is a perspective view of a bottom cover according to the first embodiment of the housing assembly of FIG. 1.
Figure 6:
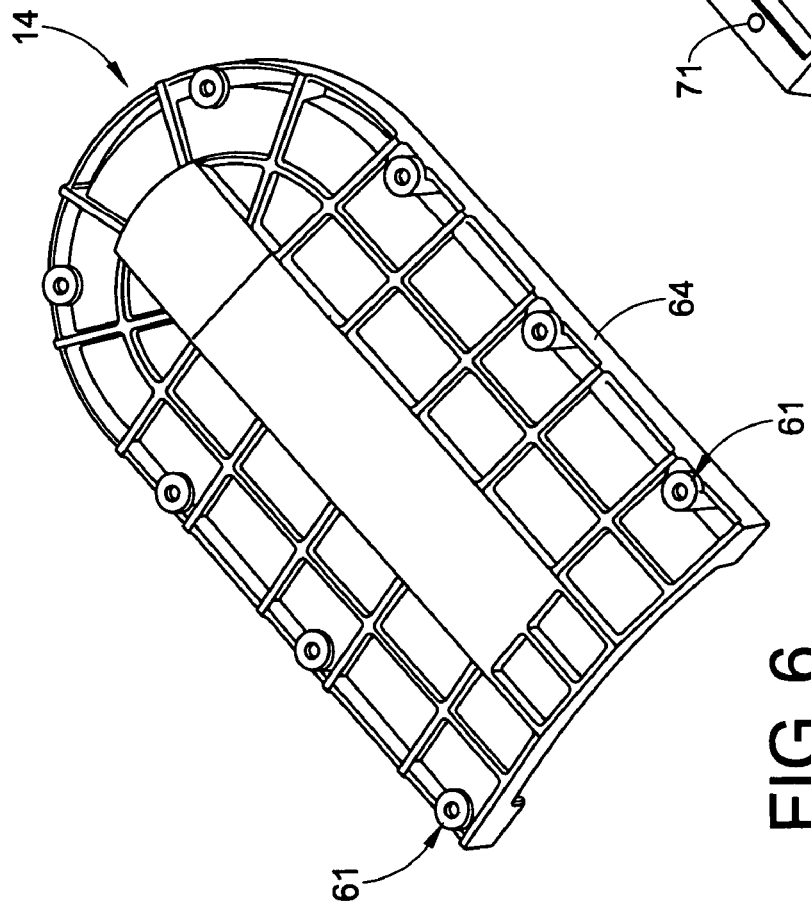
FIG. 6 is a perspective view of a top cover according to the first embodiment of the housing assembly of FIG. 1.

Referring now to FIGS. 4-6, the sealing engagement of the cover members 14, 16 with the enclosure base 12 and the end plate 18 is there illustrated. The top cover member 14 includes a series of retention holes 61 adapted for carrying a set of regularly spaced apart captive bolt members 62 along an outwardly extending flange 64 as illustrated. A set of engagement holes 66 are arranged along the outer flange 68 of the top of the enclosure base 12 in a manner and at locations adapted to correspond to the positions of the retention holes 61 and associated captive bolt members 62 on the top cover member 14. Similarly, the bottom cover member 16 includes a series of retention holes 71 adapted for carrying a set of regularly spaced apart captive bolt members 72 along an outwardly extending flange 74 as illustrated. A set of engagement holes 76 are arranged along an outer flange 78 of the bottom of the enclosure base 12 in a manner and at locations adapted to correspond to the positions of the retention holes 71 and associated captive bolt members 72 on the bottom cover member 16. In that way, the top and bottom cover members 14, 16 can be easily brought together into their final assembled position with the enclosure base 12 therebetween, as shown in FIGS. 1 and 4. The perimeter seal rings 48, 50 are designed to compress against an opposing gasket element 82, 84 contained within each cover member 14, 16. This feature is integrated into both sides of the enclosure base 12.

Figure 9:
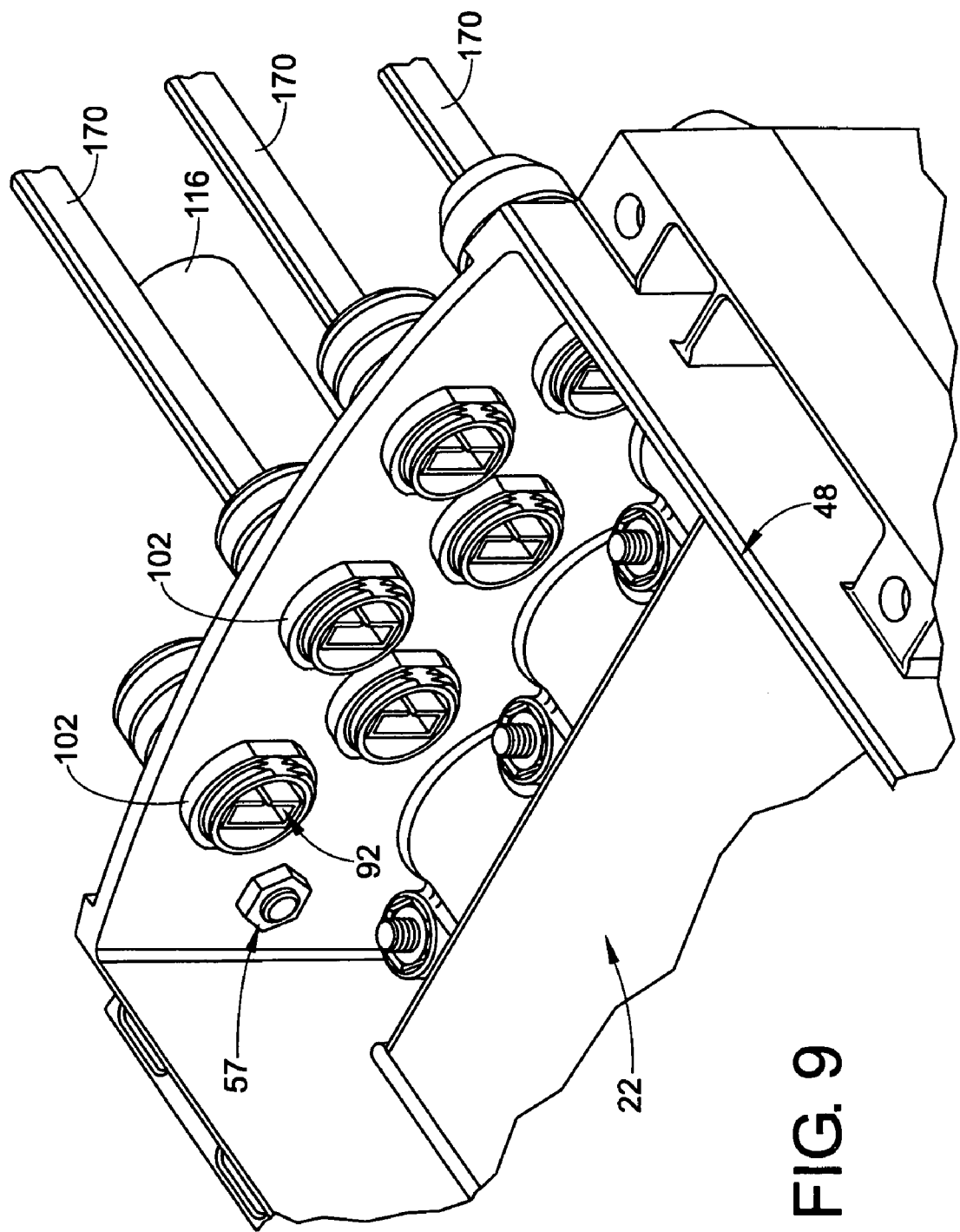
FIG. 9 is an enlarged rear perspective view illustrating an adapter bulkhead and cable entrance ports according to the first embodiment.

In order to provide for a waterproof and airtight splice case assembly 10, the resilient sealing gasket members 82, 84 are provided as illustrated. The sealing gasket members 82, 84 can be formed of a continuous loop of a sealing material that is readily bendable and moldable into various shapes including that illustrated in FIG. 4. The air valve port 54 and the air valve 56 therethrough can be integrated into the bulkhead 42 of the splice case assembly 10 to allow for post-assembly pressurization in order to check integrity of the enclosure seals 82, 84. The air valve 56 can be tightened to the bulkhead 42 by a fastening nut 57 (FIG. 9). It is to be appreciated that one or more aerial hanger brackets 86 can be attached to the outside of the splice case 10 for connection of the unit in aerial applications. Alternatively, the hanger brackets 86 can be utilized for the attachment of a wall mount bracket for splice cases 10 installed against the side of a building (not illustrated).

Figure 7:
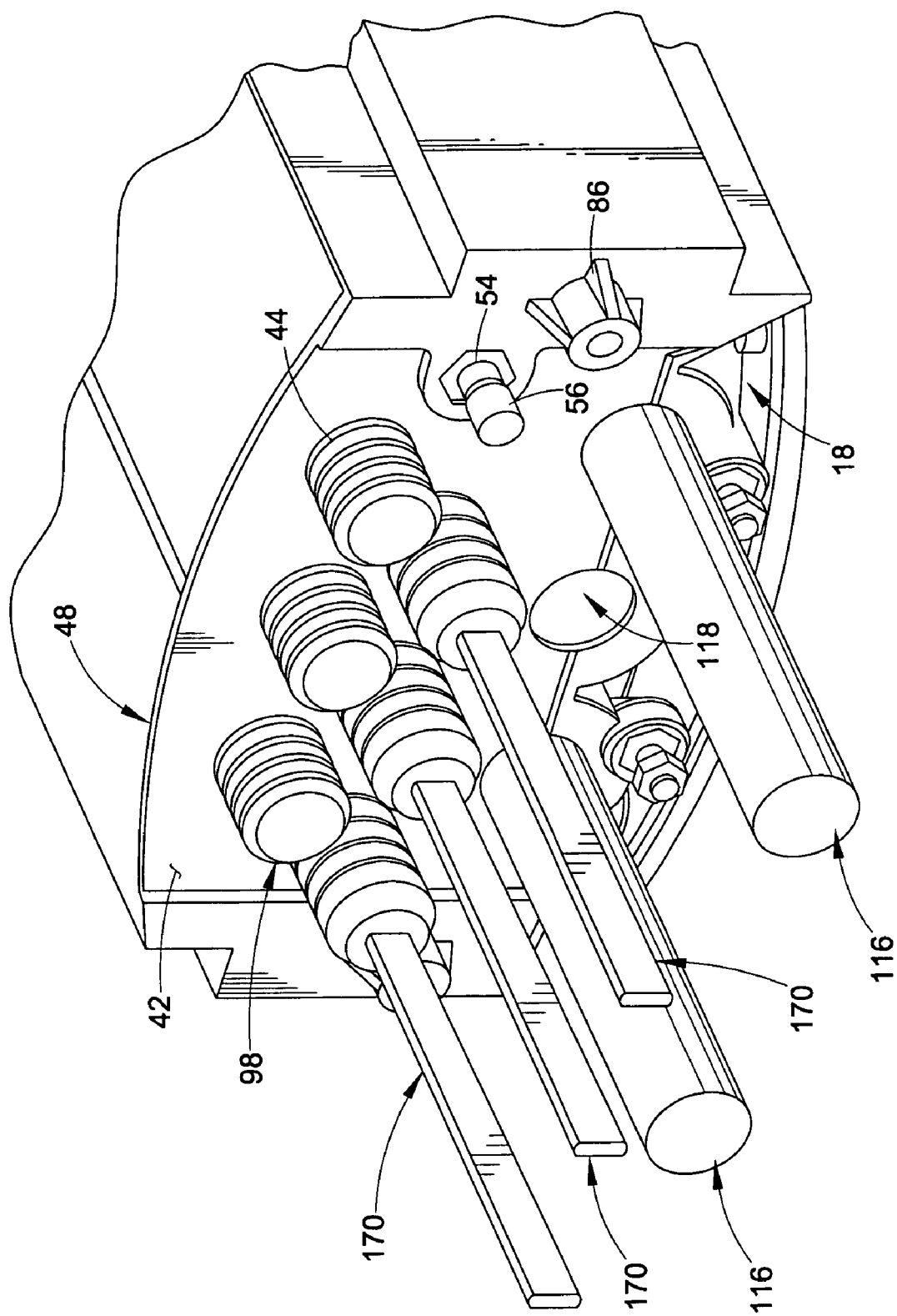
FIG. 7 is an enlarged front perspective view illustrating an adapter bulkhead and cable entrance ports according to the first embodiment.
Figure 8:
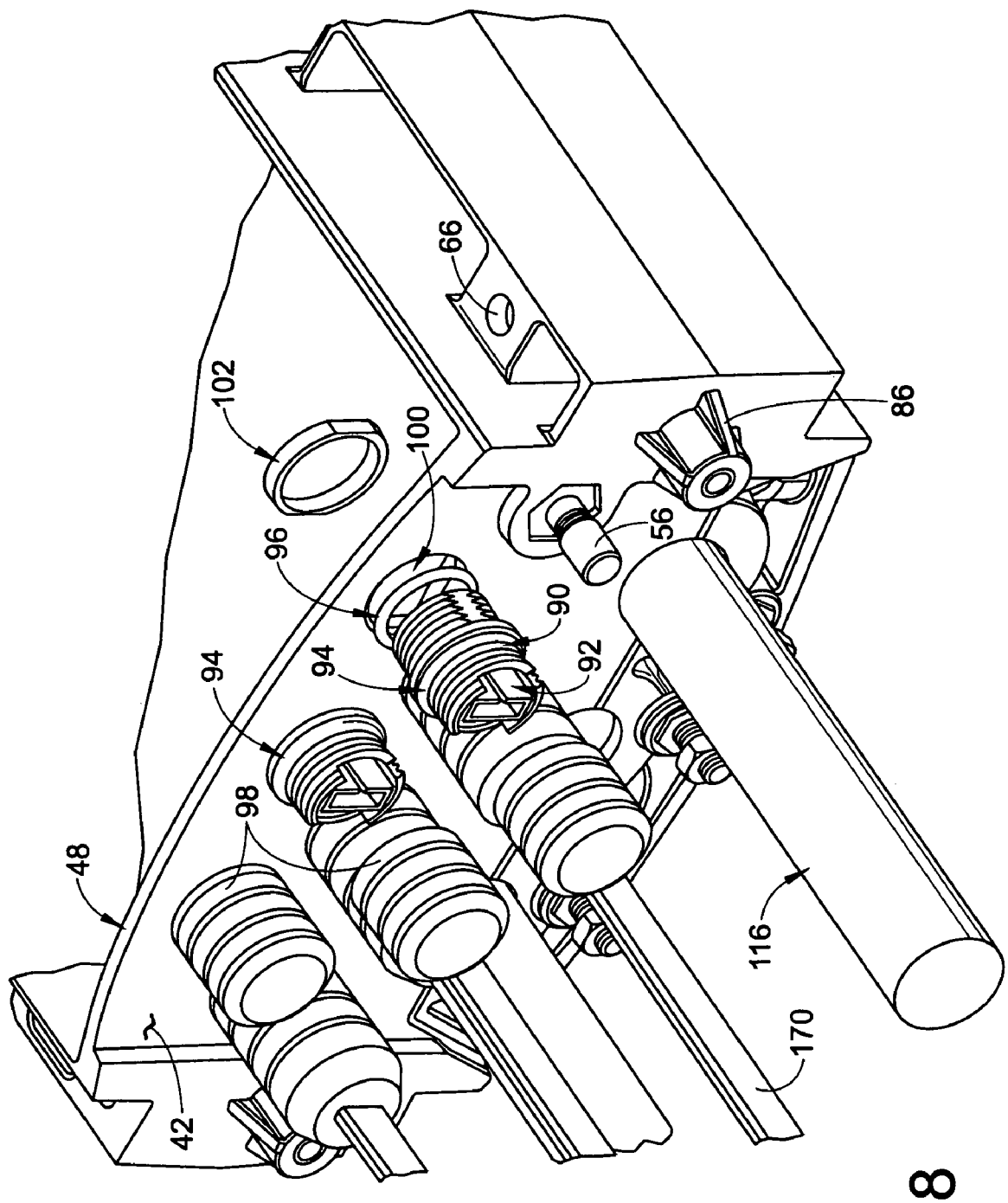
FIG. 8 is an enlarged front perspective view illustrating a fiber connector and a fiber adapter according to the first embodiment.

Referring now to FIGS. 7-9, the adapter bulkhead 42 is illustrated including cable entrance or fiber adapter ports 44 passing therethrough. During the splice case 10 assembly process, fiber adapters 90 can be installed into the adapter bulkhead ports 44. Two O-rings 94, 96 can be assembled onto fiber adapters 90. The first O-ring 94 provides a mechanism for sealing a dust cover 98 around the fiber adapter 90. The second O-ring 96 allows for the fiber adapter 90 to be sealed against the outside of the adapter bulkhead 42 when compressed into an O-ring groove 100 and tightened down by a fastening nut 102. The fiber adapters 90 can each include a fiber connector 92 therein (FIGS. 8 and 9).

Figure 10:
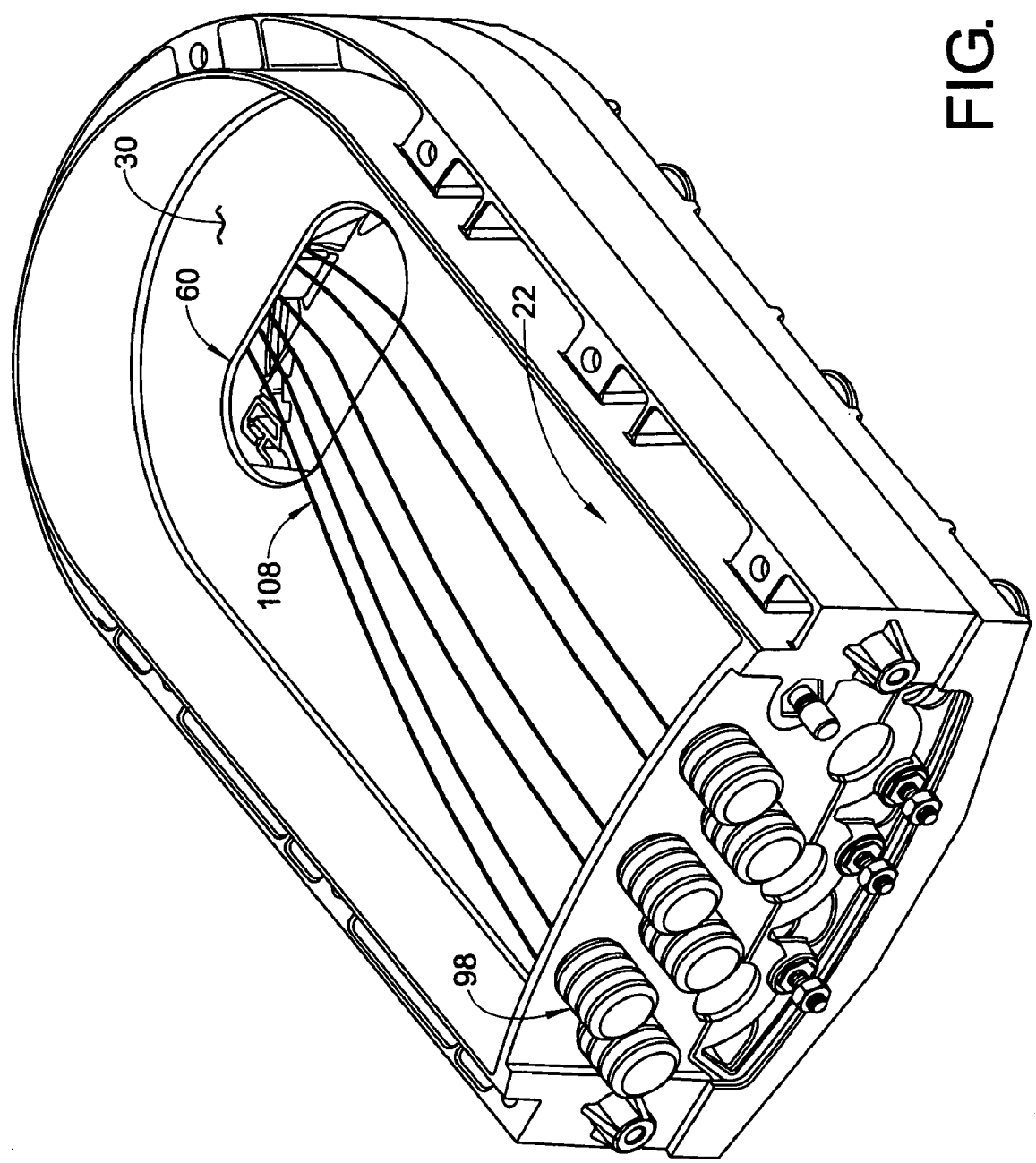
FIG. 10 is an enlarged top perspective view illustrating the base assembly including a drop chamber therein.
Figure 11:
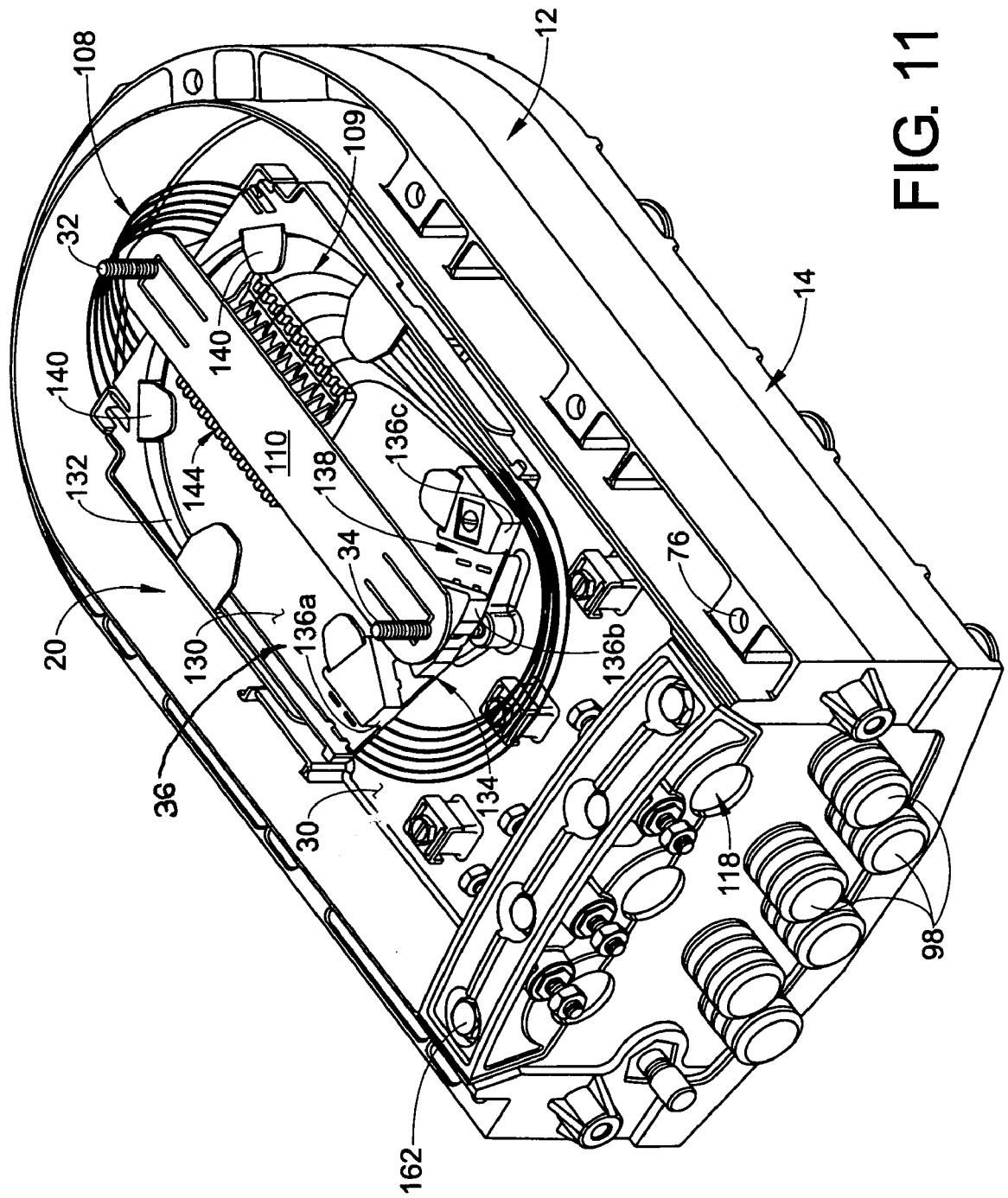
FIG. 11 is an enlarged bottom perspective view illustrating the base assembly including a splicing chamber therein.

Referring now to FIGS. 10 and 11, a plurality of fiber jumpers or enclosed optical fibers 108 are illustrated which are connected to the fiber connectors 92 and extend through the drop chamber 22 and are routed down through the access port 60 onto the splicing tray 36. A fiber tray strap 110 can be provided for securing the fiber splicing tray 36 to the posts 32, 34. The drop chamber 22 acts as a storage and routing area for the fiber jumpers 108. The fiber jumpers 108, including exposed fibers 109, can be spliced (connected) to fiber from feeder cables 116 on the splicing tray 36 in the splice chamber 20 of the enclosure base 12 (not shown). It is to be appreciated that excess drop wire can also be stored in the drop chamber 22 prior to being connected to the fiber adapters 90. Additionally, the drop chamber 22 can be used for housing amplification or monitoring electronics.

As previously mentioned, the splice tray 36 can be positioned within the splicing chamber 20 of the subject splice case assembly 10. Although the splice tray 36 could have a variety of configurations, by way of example the form for the tray 36 in one embodiment is shown best in FIGS. 11 and 12. As illustrated there, the splice tray 36 generally comprises a molded plastic tray member having an outer peripheral size and shape which is rectangular and generally corresponds to the size and shape of the space available in the splicing chamber 20. The tray 36 generally includes a flat bottom wall 130, an upwardly extending side wall 132 partially surrounding the outer periphery, and a partially open front edge 134. The front edge 134 of the splice tray 36 can include a wall partitioned into a set of discontinuous end wall portions 136*a*, 136*b*, 136*c*. Spacing 138 between the end wall portions 136*a*, 136*b*, 136*c* provides a set of fiber optic entrance areas that enable the fiber ends to pass therethrough between the flat bottom wall 130 of the splice tray 36 and the cover 16 when the cover 16 is in its closed and assembled configuration.

In order to assist in restricting fiber jumper 108 movement within the splice tray 36 and to provide for an orderly arrangement of cable leads within the splice tray 36, a set of retainers or capture tabs 140 are releasably retained in position by the side wall 132 of the splice tray 36 in the manner shown. Each of the capture tabs 140 can have a downwardly extending leg portion that is releasably received into a corresponding longitudinally extending groove formed along the splice tray 36 side wall (not shown). Further, each of the capture tabs 140 can include an inwardly extending retainer portion that is adapted to overlay the flat bottom wall 130 of the splice tray 36 so that cable lead portions can be routed between the retainer portions of the capture tabs 140 and the flat bottom wall 130 of the splice tray 36 (not illustrated). In addition, to further enable the orderly management of cable leads at the splice tray 36, the flat bottom wall 130 of the tray 36 can be provided with a key hole slot connection area 144 shown generally in FIGS. 11 and 12.

The initial assembly process can provide for each of the fiber adapter ports 44 to have a fiber adapter 90 and a dust cover assembly 98 installed thereon. The plurality of fiber jumpers 108 can be connected to the fiber connectors 92 and routed through the access port 60 onto the splicing tray 36. The fiber tray strap 110 can secure the fiber splicing tray 36 to the posts 32, 34 in the splicing chamber 20. The bulkhead 42 and the end plate 18, when assembled, form a plurality of feeder cable ports 118. The unused feeder cable ports 118 can be fitted with plugs 120 and the end plate 18 secured therearound. The bottom cover 16 can then be sealingly secured to the bottom of the enclosure base 12. The end plate 18 includes a plurality of sealing surfaces and can include a soft rubber-like material overmolded onto the exterior surfaces of the end plate 18. Additionally, the end plate 18 includes a series of grounding inserts 154 therethrough.

Figure 12:
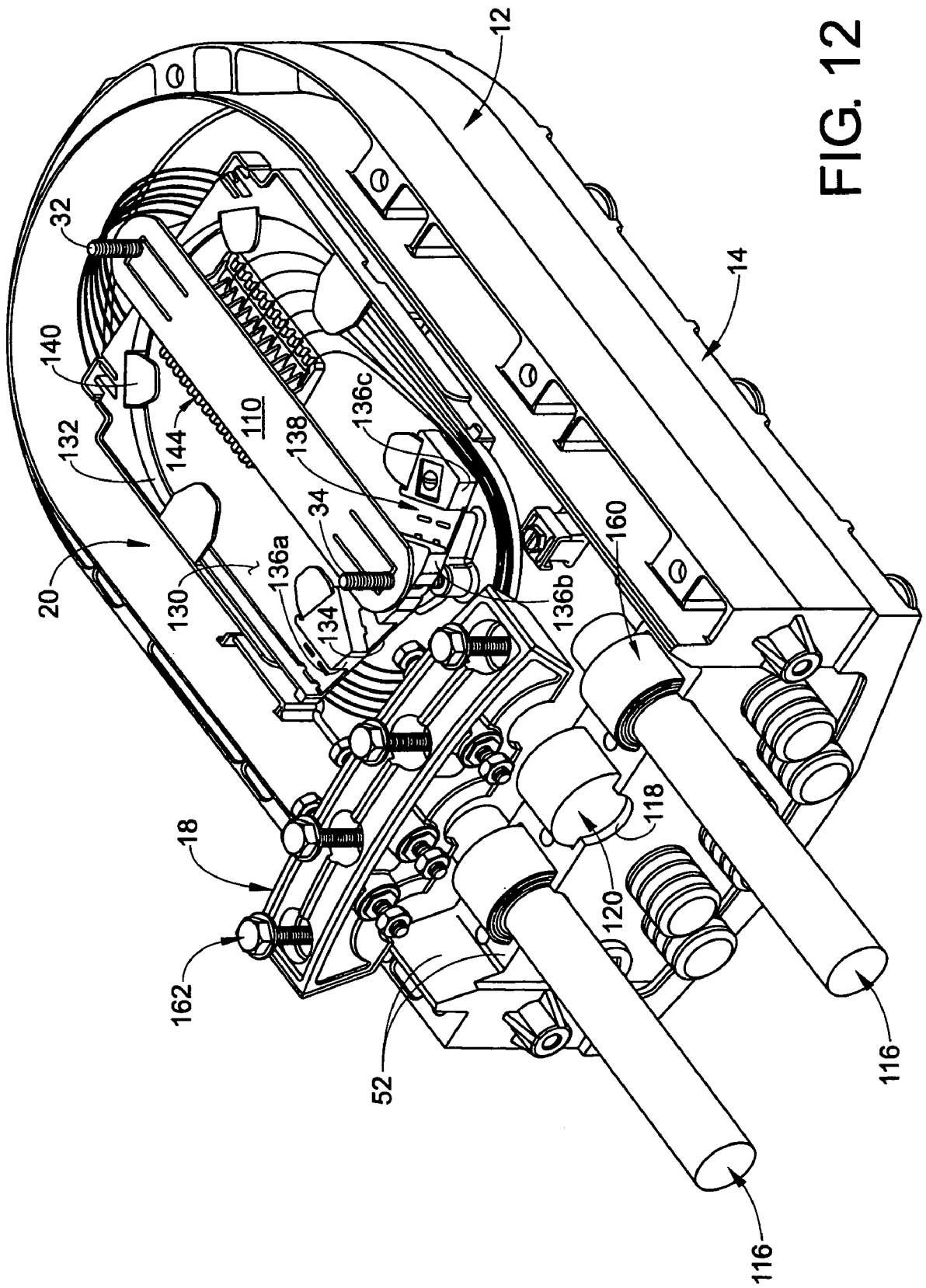
FIG. 12 is an enlarged bottom perspective view illustrating the cable ports and an end plate.
Figure 13:
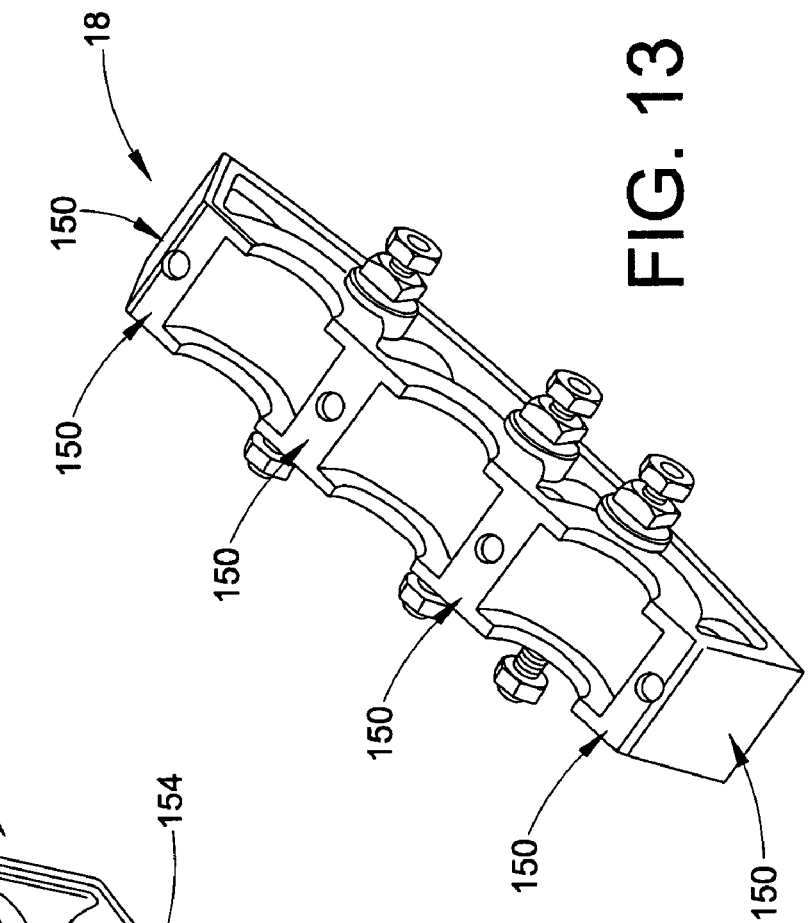
FIG. 13 is a bottom perspective view of the end plate according to the first embodiment of the housing assembly.
Figure 14:
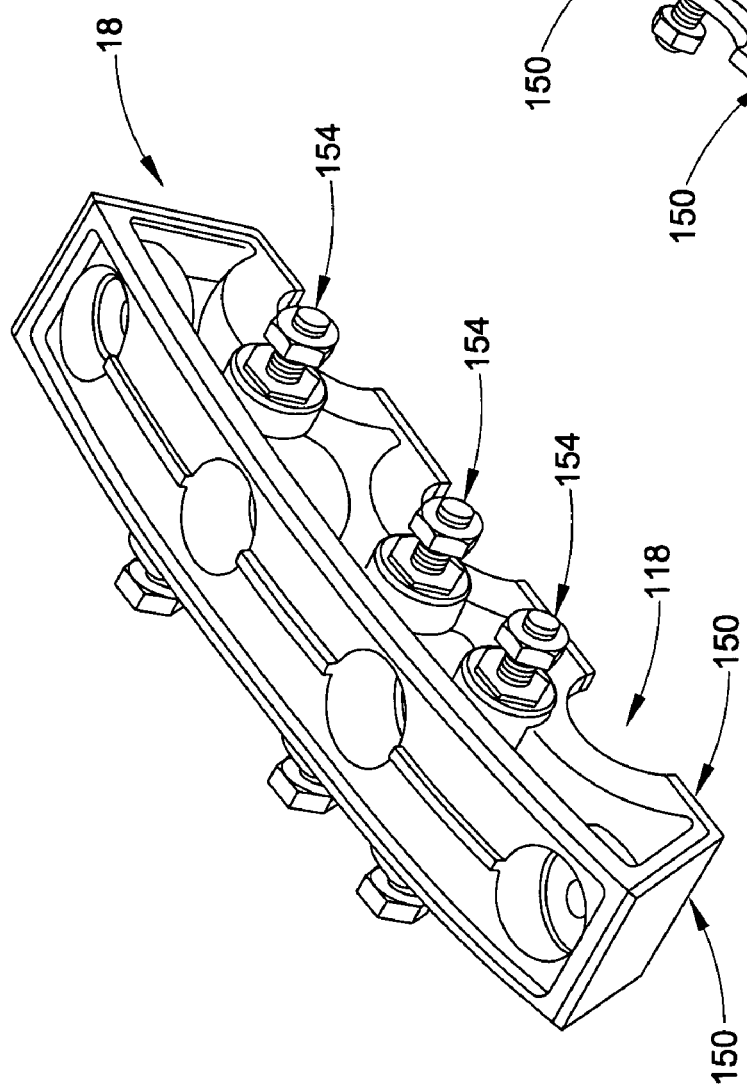
FIG. 14 is a top perspective view of the end plate according to the first embodiment of the housing assembly.
Figure 15:
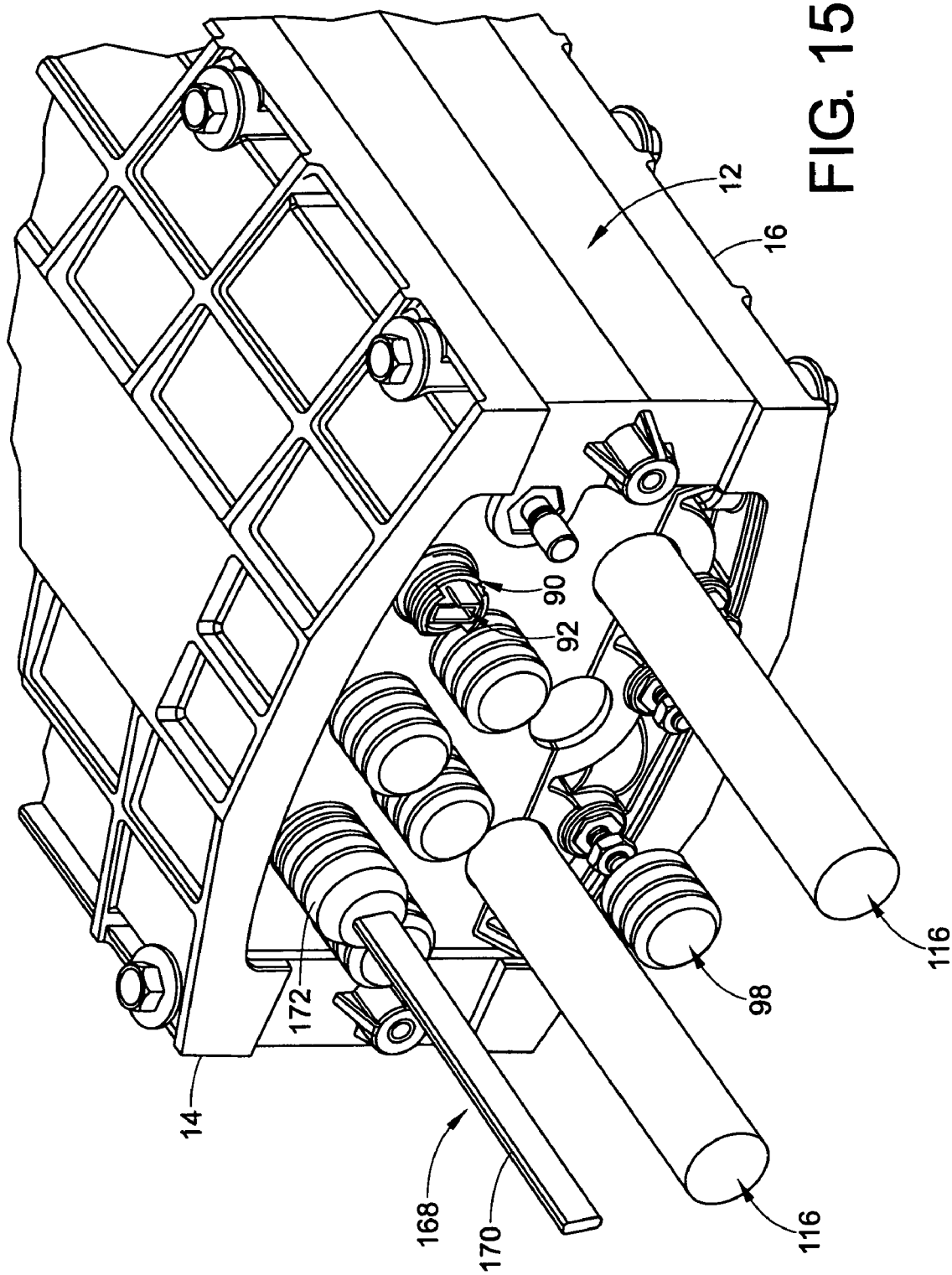
FIG. 15 is an enlarged partial front perspective view of the housing assembly according to the first embodiment.

In the field, the splice case assembly 10 can, for example, via hanger brackets 56, be either suspended from a strand for aerial applications, mounted to a wall with accessory hardware, or placed inside hand holes or manholes below ground level. In order to connect the fiber splice case 10 to one or more feeder cables 116, an operator removes the bottom cover 16 and the end plate 18 to access the splicing chamber 20 whereby a selected feeder cable 116 can be installed between the end plate 18 and bulkhead 42 in one or more of the feeder cable ports 118. A low durometer sealing tape 160 can be wrapped around the circumference of each feeder cable 116 and the end plate 18 can then be re-installed with bolts 162 in order to compress the tape 160 to form a seal around the circumference of the feeder cables 116 (FIGS. 12-14). Unused cable feeder ports 118 can remain sealed with the plugs 120. Additionally, sealing surfaces 166 of the bulkhead 42 are contacted by the sealing surfaces 150 on the end plate 18. The soft compound molded onto the sealing surfaces 150 of the end plate 18 seals the same when compressed. Fibers from the feeder cables 116 can be spliced to corresponding individual fibers 109 of fiber jumpers and the cover member 16 reassembled. The fiber splice case 10 is now ready to be accessed for individual end user connection (drops).

In order to connect the splice case 10 to an individual end user, an operator removes one or more of the dust covers 98 from the fiber adapters 90 to expose the fiber connector 92. The operator can attach a drop wire 168 including a hardened connector 170 thereon which has been prefitted with a threaded cap 172 and mating component to the fiber connector 92. It is to be appreciated that the steps to connect an individual end user takes only a matter of minutes and does not disturb the integrity of the enclosure seals. The ease of connection allows an operator with less technical capability to add service (drops) to a plurality of customers in an extremely efficient manner without affecting signals passing through to other customers.

With reference now to FIGS. 16-24, a second embodiment of an optical fiber splice case 210 is there illustrated. The second embodiment can be used for non-hardened fiber connectors.

Figure 16:
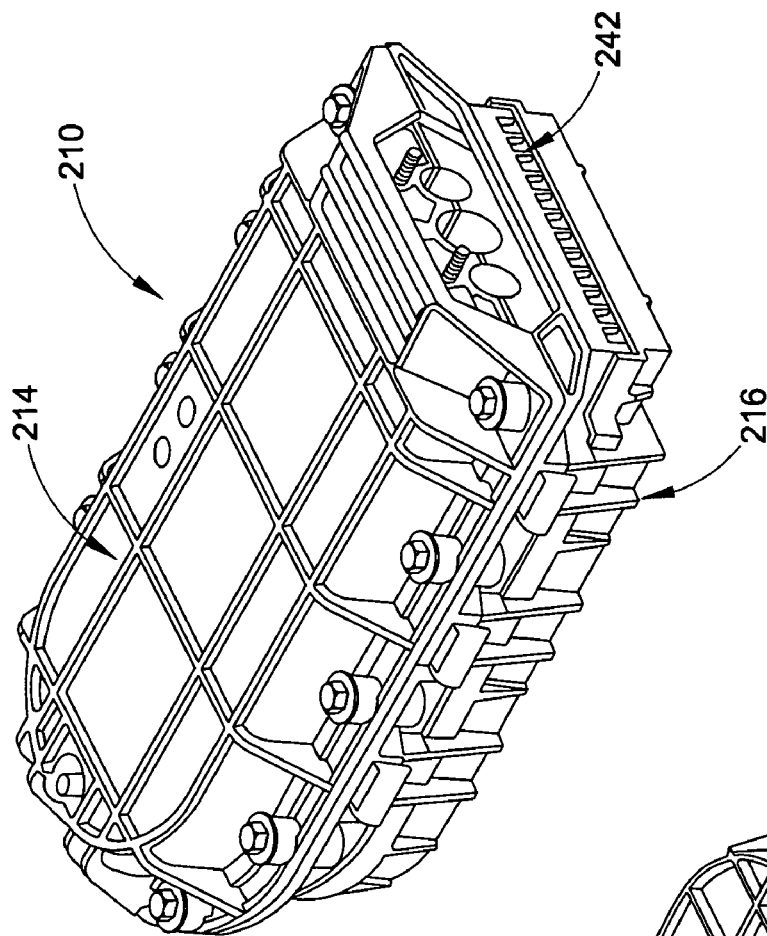
FIG. 16 shows a top perspective view of a second embodiment of a housing assembly adapted for use with fiber optic cable.
Figure 17:
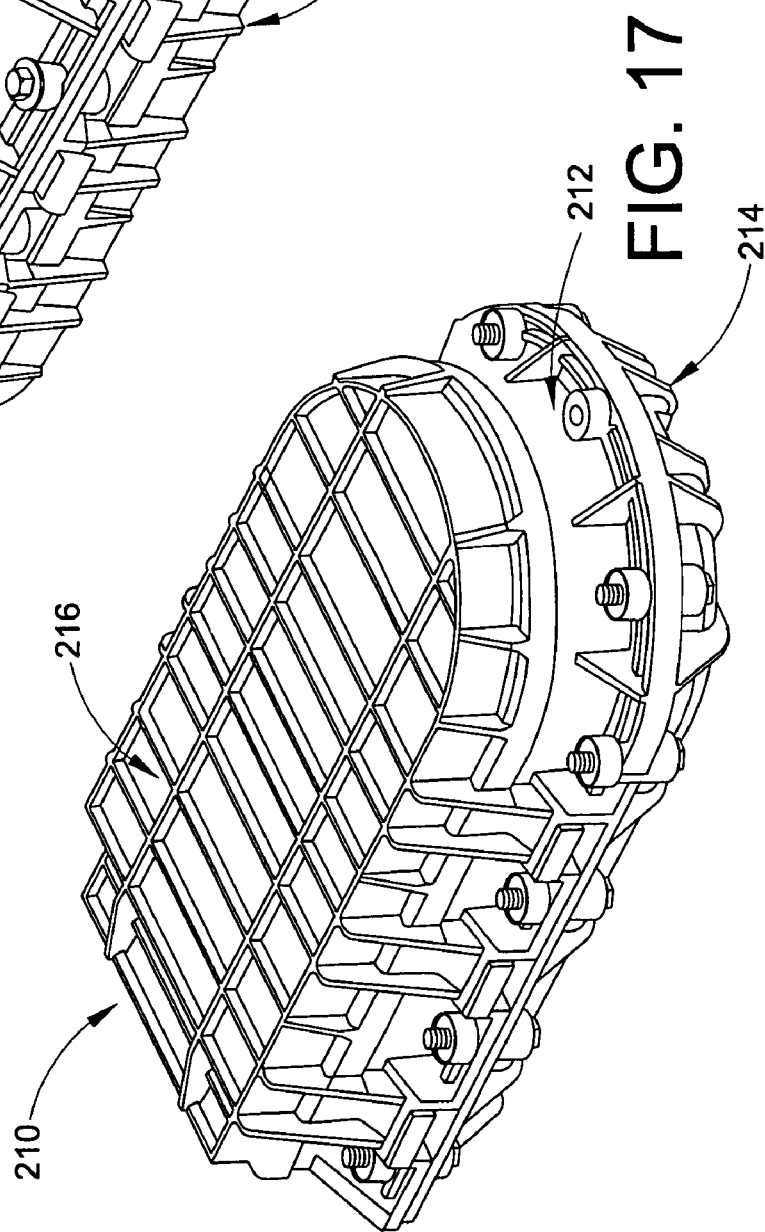
FIG. 17 shows a bottom perspective view of a second embodiment of a housing assembly adapted for use with fiber optic cable.
Figure 18:
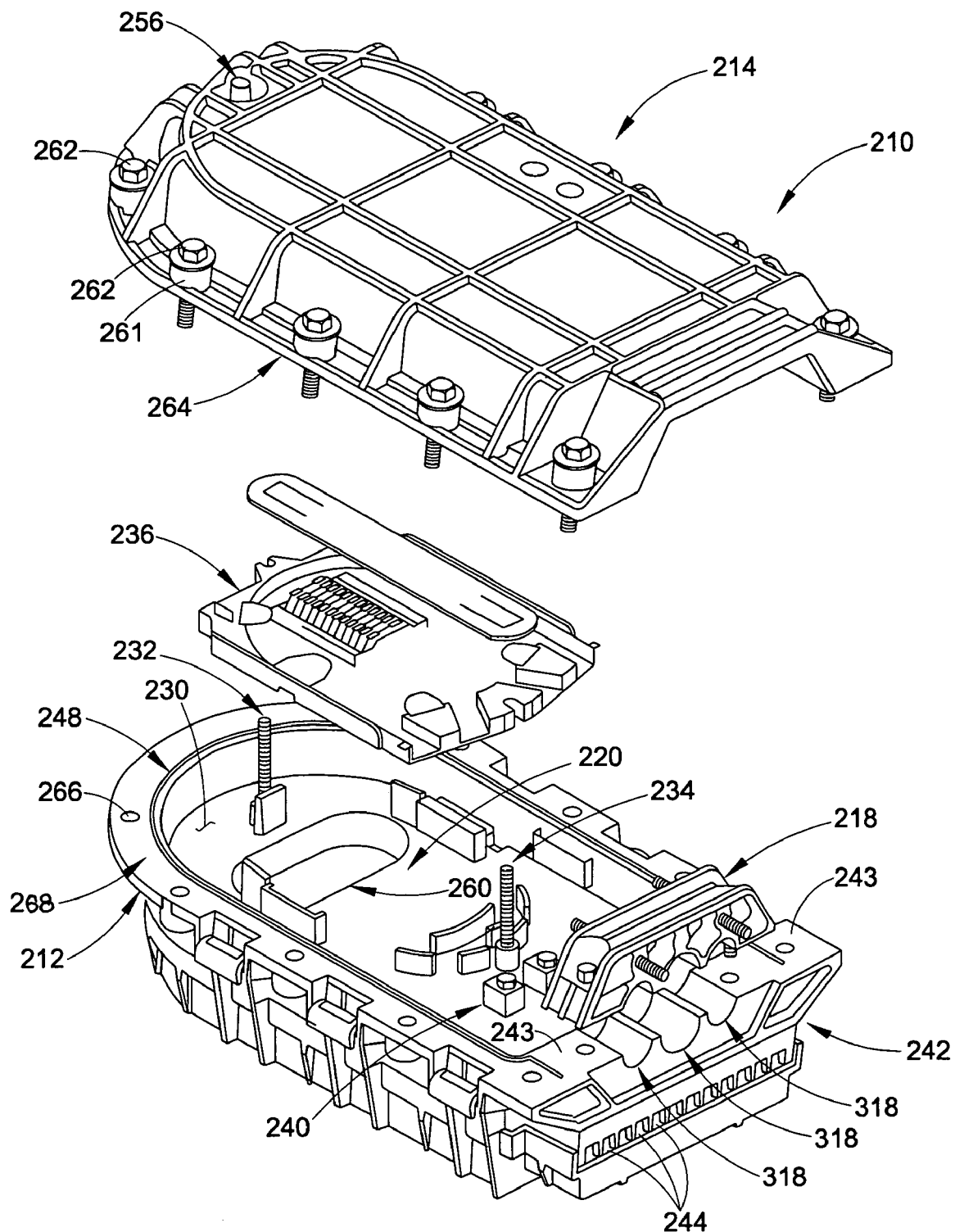
FIG. 18 shows an exploded isometric view of the second embodiment of the housing assembly.
Figure 22:
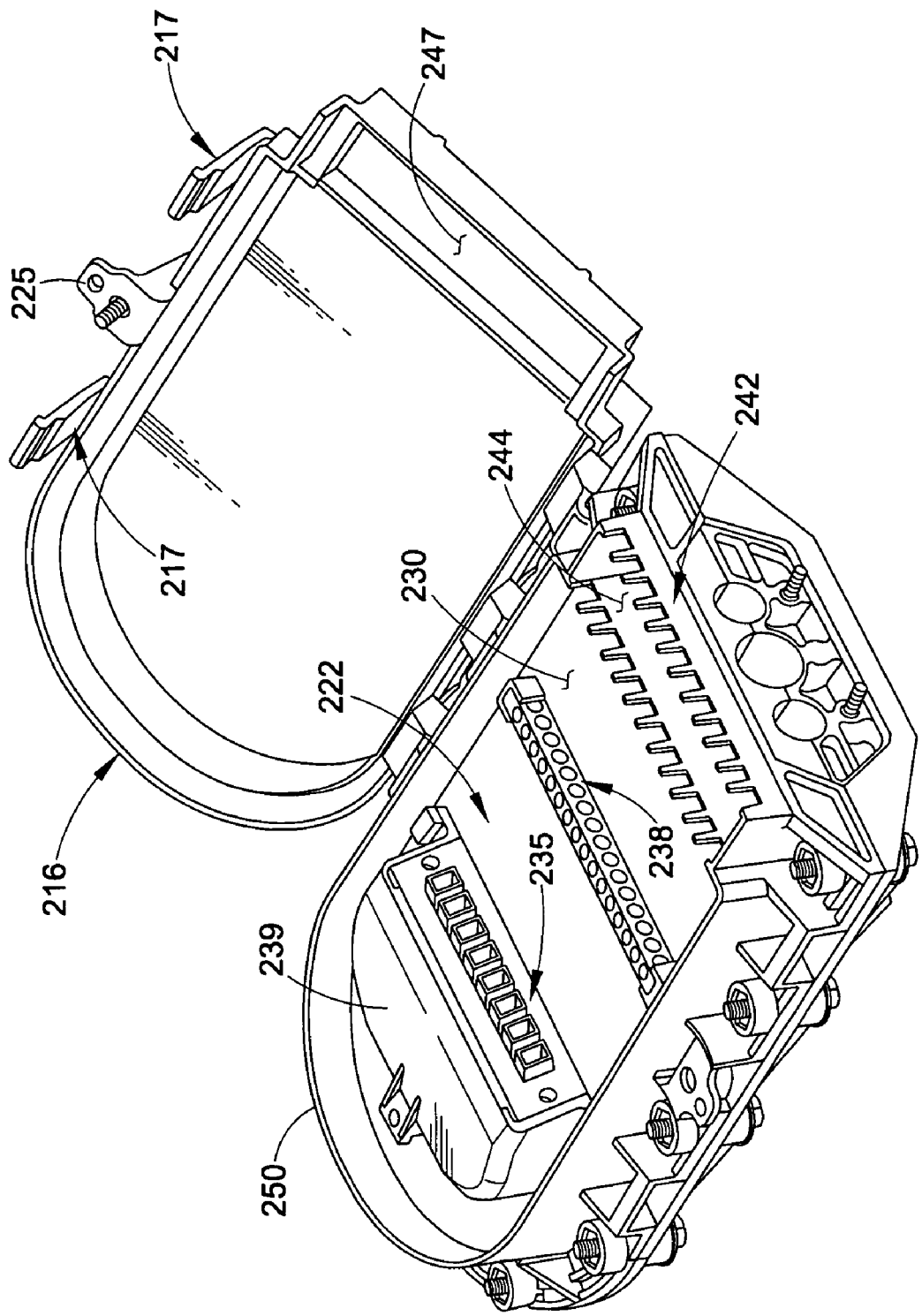
FIG. 22 shows a perspective bottom view within the housing assembly according to the second embodiment.

FIGS. 16-18 display a splice case assembly 210. The central element of the assembly 210 is the enclosure base 212. The enclosure base 212 is a double-sided element having a dividing wall 230 which creates two distinct secure chambers 220, 222 (FIGS. 18 and 22). FIG. 22 displays a drop chamber 222 and FIG. 18 displays a splicing chamber 220. The splicing chamber 220 incorporates a pair of posts 232, 234 mounted to the dividing wall 230 to allow for the installation of a splicing tray 236. A series of tie-down brackets 240 are also attached to the dividing wall 230 at which strength members from incoming cables (not shown) are tied down to prevent the incoming cables from pulling out. The enclosure base 212 can include a bulkhead 242 with a plurality of fiber entry ports or drop wire slots 244 therethrough. Each side of the enclosure base 212 can include a perimeter with a perimeter seal ring 248, 250. The bulkhead 242 can include an end plate sealing area 243 along one side. The dividing wall 230 includes an access port 260 therethrough providing a passageway between the splicing chamber 220 and the drop chamber 222.

Referring now to FIG. 18, the sealing engagement of a top cover member 214 with the enclosure base 212 and the end plate 218 is illustrated. The top cover member 214 includes a series of retention holes 261 adapted for carrying a set of regularly spaced apart captive bolt members 262 along an outwardly extending flange 264 as illustrated. A set of engagement holes 266 are arranged along the outer flange 268 of the top of the enclosure base 212 in a manner and at locations adapted to correspond to the positions of the captive bolt members 262 on the top cover member 214. In that way, the top cover member 214 can be easily brought together into its final assembled position with the enclosure base 212 as shown in FIG. 16.

Referring now to FIGS. 19 and 20, a bottom cover member 216 is illustrated. The bottom cover 216 can include a pair of selectively engaged locking tabs 217. The enclosure base 212 can include a pair of locking fasteners 219 on one side for mating engagement with the tabs 217. The bottom cover 216 further includes a retention hole 221 adapted for carrying a captive bolt or locking fastener 223 on an outwardly extending flange 225. The enclosure base 212 can include an engagement hole 226 at a position to correspond to the position of the retention hole 221 and associated locking fastener 223. The bottom cover member 216, on the other side, carries a plurality of pivot hooks 227 for hinged connection with a plurality of associated hinge pins 229 carried on the enclosure base 212. Perimeter seal rings 248, 250 can be designed to compress against an opposing gasket element (not illustrated) contained within each cover member 214, 216. In order to provide for a waterproof and airtight splice case assembly 210. The sealing gasket member can be formed of a continuous loop of a sealing material that is readily bendable and moldable into various shapes including that illustrated in FIGS. 18 and 21 (i.e. 248, 250). This feature is integrated into both sides of the enclosure base 212.

An air valve 256 can be integrated into the top cover 214 of the splice case assembly 210 to allow for pressurization in order to check integrity of the enclosure seals after assembly. It is to be appreciated that an aerial hanger bracket (not shown) can be attached to the outside of the splice case 210 for connection of the unit in aerial applications. Alternatively, the hanger bracket can be utilized for the attachment of a wall mount bracket for splice cases installed against the side of a building.

Figure 21:
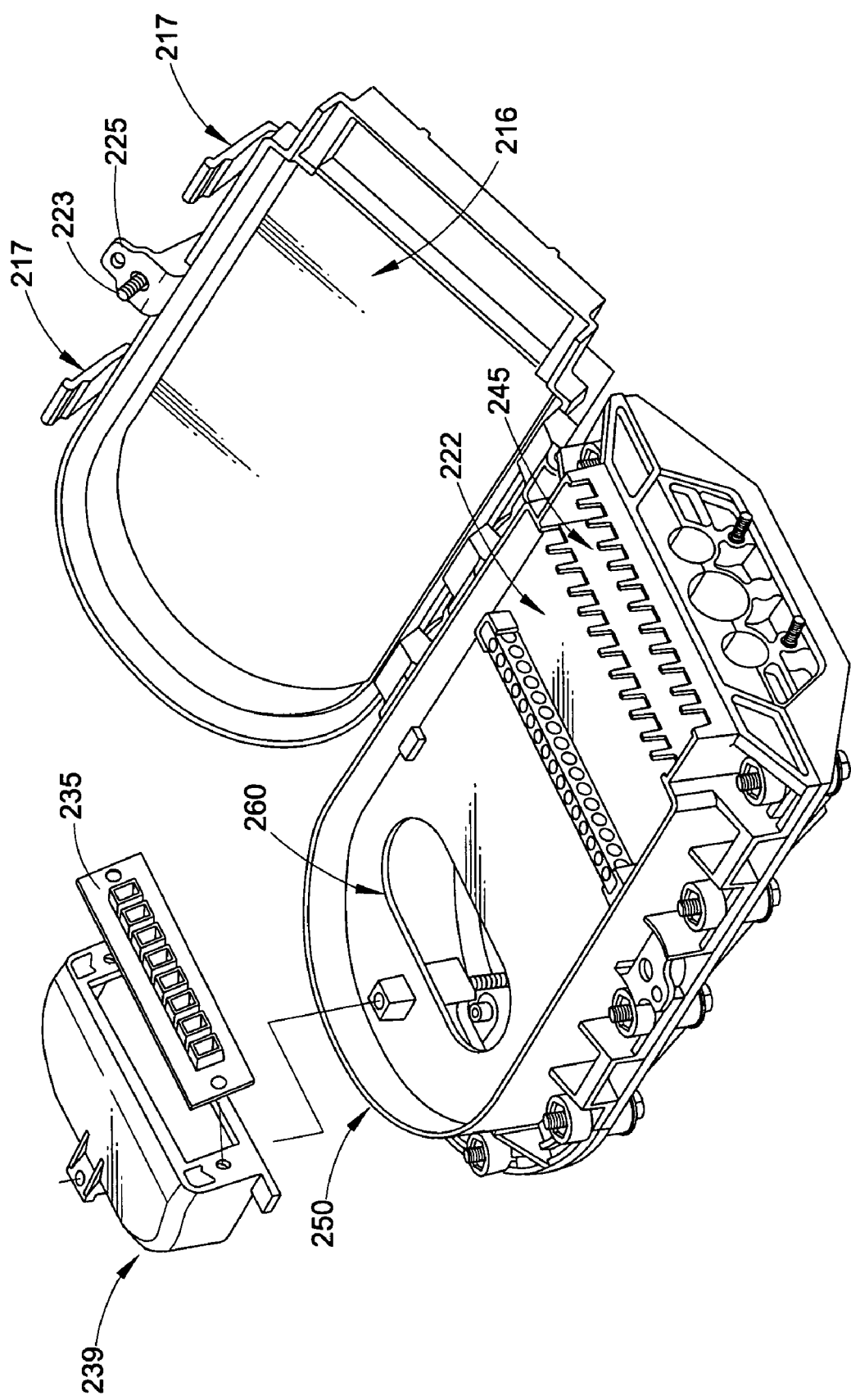
FIG. 21 shows an exploded bottom perspective view within the housing assembly according to the second embodiment.
Figure 23:
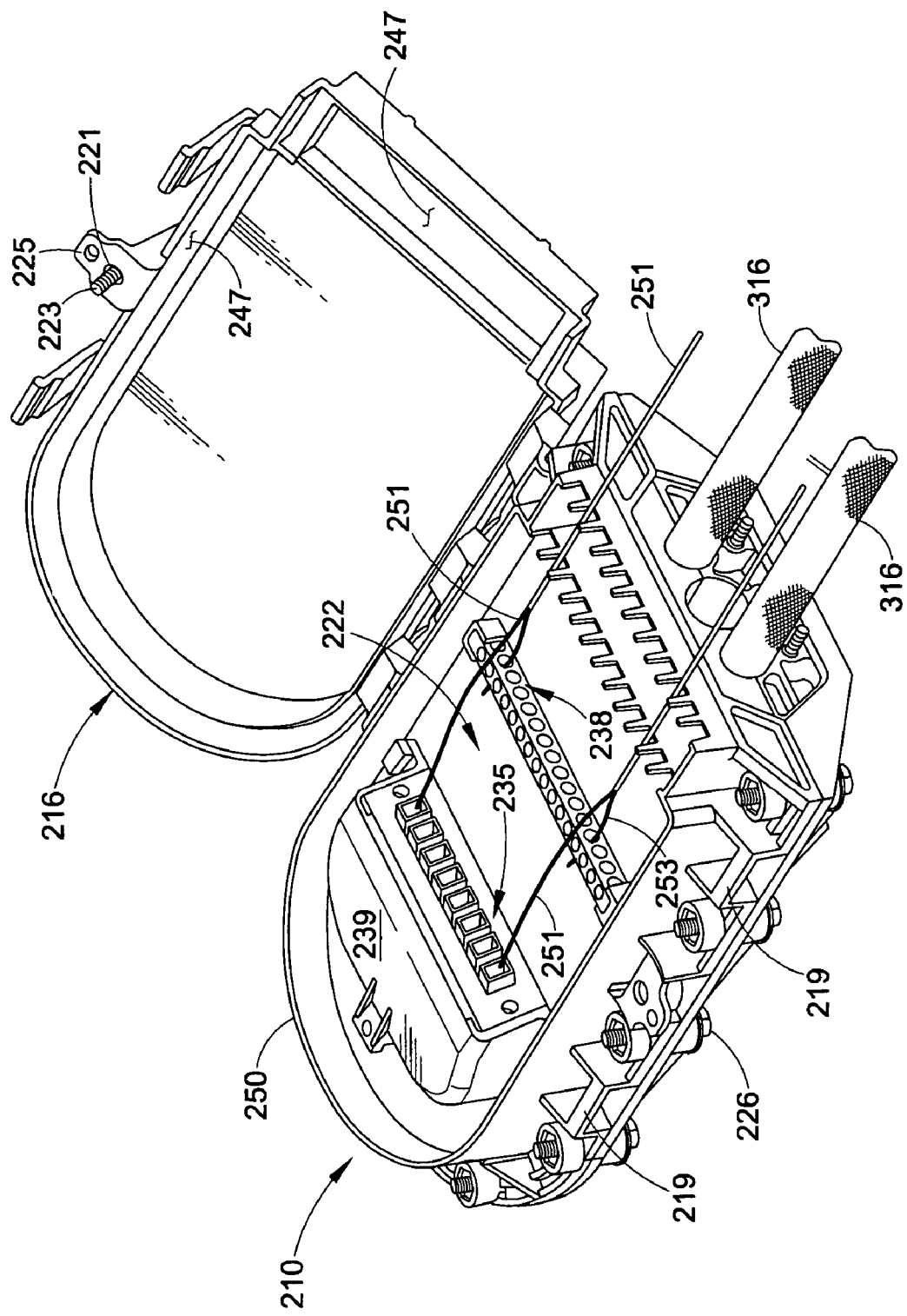
FIG. 23 is a bottom perspective view within the housing assembly showing fiber drops according to the second embodiment; and, FIG. 24 is a top perspective view within the housing assembly showing individual fibers within a splice chamber according to the second embodiment.

Referring now to FIGS. 21-23, the drop chamber 222 and related components are therein illustrated. The drop chamber 222 includes the bulkhead 242 having the fiber entry ports 244 passing therethrough. The bulkhead area surrounding the fiber entry ports can include a gel-filled area 245 for sealing engagement with the drop chamber cover 216 in the closed position. The dividing wall 230 includes a tie-down bar 238 thereacross between the bulkhead 242 and a fiber connector plate 235. The fiber connector plate 235 can include a shroud 239 connected thereto. The shroud 239 is generally located above the access port 260. As will be described in more detail below, the fiber entry ports 244 or drop wire entry slots allow a fiber drop 251 to pass therethrough. The fiber drops 251 extend through the drop chamber 222 and can be attached to the tie-down bar 238 and plugged into the fiber connector plate 235. The tie-down bar 238 accepts a strength member 253 from each fiber drop 251 to prevent pullout of the fiber drop 251. It is to be appreciated that the fiber drops 251 in this embodiment can be non-hardened fiber drops having a preconnectorized terminal end.

Figure 24:
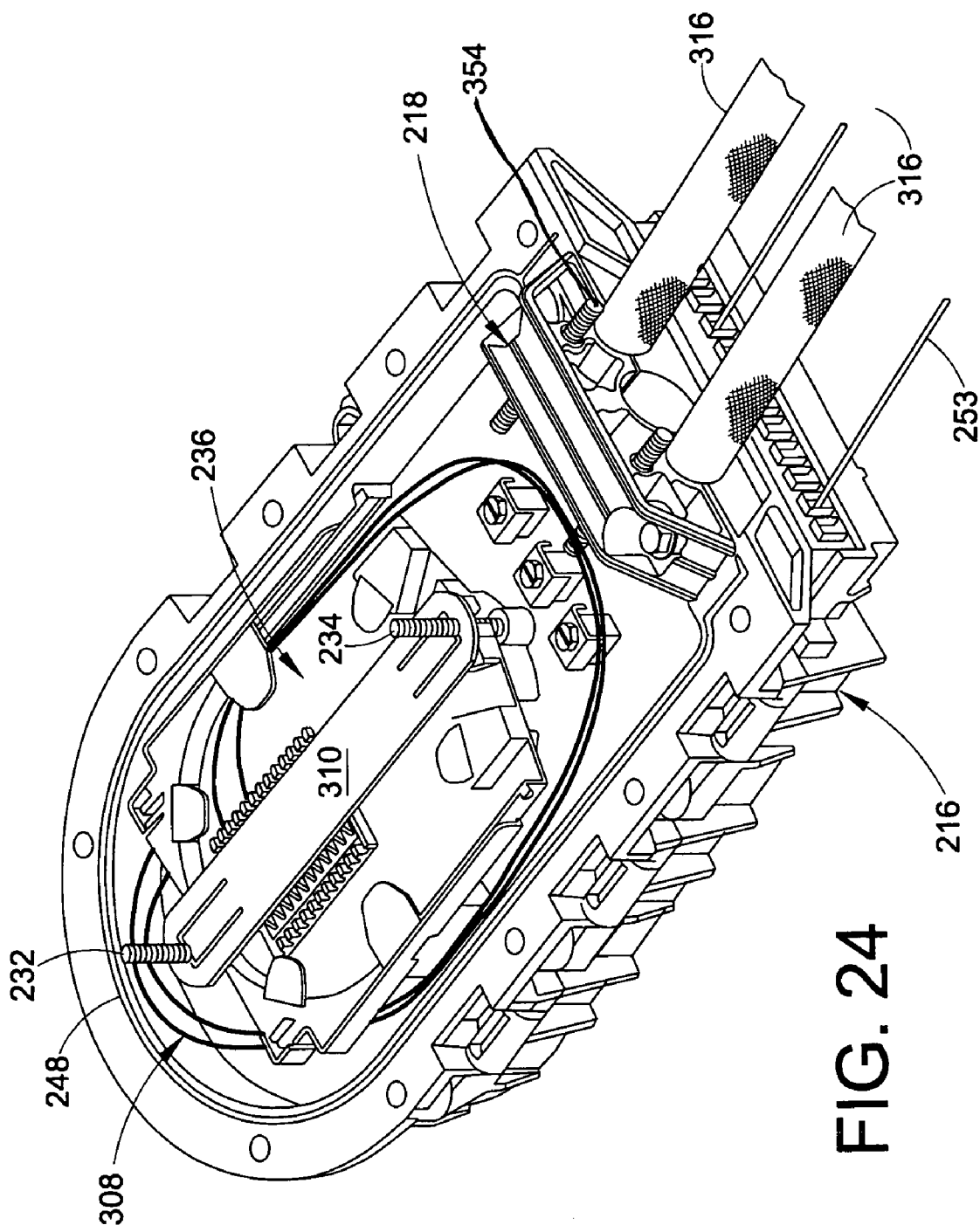

Referring now to FIG. 24, a plurality of fiber jumpers 308 are illustrated which are connected to the back of the fiber connector plate 235 and extend through the access port 260 and are routed onto the splicing tray 236. The shroud 239 serves as a protective cover over the fiber jumper connection points (not displayed). A fiber tray strap 310 can be provided for securing the fiber splicing tray 236 to the posts 232, 234.

At the initial assembly process, the plurality of fiber jumpers 308 can be connected to the fiber connectors and routed through the access port 260 onto the splicing tray 236. The fiber tray strap 310 secures the fiber splicing tray 236 in the splicing chamber 220. As described above, feeder cable ports 318 can be fitted with plugs and the end plate 218 secured therearound. The covers 214, 216 can then be sealingly secured to the enclosure base 212. The end plate 218 can include a plurality of sealing surfaces and can include a soft rubber-like material overmolded onto the exterior surfaces of the end plate 218. Additionally, the end plate 218 can include a series of grounding inserts 354 therethrough.

In the field, the splice case assembly 210 can be either suspended from a strand for aerial applications, mounted to a wall with accessory hardware, or placed inside hand holes or manholes below ground level. In order to connect the fiber splice case 210 to one or more of the feeder cables 316, an operator removes the top cover member 214 and the end plate 218 to access the splicing chamber 220 whereby a selected feeder cable 316 can be installed between the end plate 218 and bulkhead 242 in one or more of the feeder cable ports 318. A low durometer sealing tape can be wrapped around the circumference of each feeder cable 316 and the end plate 218 can then be re-installed with bolts in order to compress the tape to form a seal around the circumference of the feeder cables (not illustrated). Unused cable feeder ports 318 can remain sealed with plugs. Additionally, the sealing surfaces of the bulkhead are contacted by the sealing surfaces on the end plate. The soft compound molded onto the sealing surfaces of the end plate seals the same when compressed. Fibers from the feeder cables can be spliced to corresponding fiber jumpers on the splice tray and the splice chamber cover member 214 is reassembled. The fiber splice case is now ready to be accessed for individual end user connection.

In order to connect the splice case 210 to an individual end user (drop), the operator unlatches the locking tabs 217 and unfastens the locking fastener 223 which allows the drop chamber cover 216 to hinge open thereby exposing the drop chamber 222. The operator then attaches a drop wire 251, including a non-hardened connector thereon, to the fiber connector plate 235. The drop wires 251 can include a strength member 253 which can be attached to the tie-down bar 238 to prevent pullout of the fiber drop. The drop wires 251 extend through the entrance ports 244 of the bulkhead 242 and continue outward to the terminal connection of the customer. It is to be appreciated, that multiple fiber drops 251 can be connected in the same manner.

Once the drop has been connected, the drop chamber cover 216 can be closed over the drop chamber 222 and the locking tabs 217 and locking fastener 223 secured to the enclosure base 212. It is to be appreciated that the drop chamber cover 216 can include a gel-filled area 247 at one end corresponding to the gel-filled area 245 of the bulkhead for compressing against the drop wires 251 to form a seal once the drop chamber cover 216 is closed around the enclosure base 212. The steps described above, particularly to connect an individual end user, takes only a matter of minutes. The ease of connection allows an operator with less technical capability to add service (drops) to a plurality of customers in an efficient manner without having to remove the enclosure 210 from its location and temporarily relocate to a temperature-controlled environment.

Obviously, modifications and alterations will occur to others upon a reading and understanding of this specification. It is intended that the invention be construed as including all such modifications and alterations as fall within the scope of the appended claims or the equivalents thereof.

The invention claimed is:

1. An optical fiber splice case comprising:
an enclosure base having an outer flange portion extending around said enclosure base and a dividing wall defining a drop chamber on a first side of said wall and a splicing chamber on a second side of said wall;
a first and a second cover member being selectively sealingly engaged with opposing sides of said outer flange portion of said enclosure base, said first and said second cover members each extending along the length of said outer flange port on of said enclosure base:
said first cover member enclosing and sealing said drop chamber and said second cover member enclosing and sealing said splicing chamber wherein each of said cover members is selectively sealingly engaged with opposite sides of said enclosure base for independent access to one or the other of said drop chamber and said splicing chamber; and,
said enclosure base includes an adapter bulkhead member having a plurality of optical fiber ports therethrough.

2. The optical fiber splice case according to claim 1, wherein said adapter bulkhead member includes an air valve therethrough.

3. The optical fiber splice case according to claim 1, wherein said bulkhead member includes at least one passageway adapted to receive a part of a feeder cable therethrough.

4. The optical fiber splice case according to claim 1, wherein said dividing wall includes an access port adapted to receive a fiber jumper therethrough.

5. The optical fiber splice case according to claim 1, wherein said second side of said dividing wall includes a plurality of tie down brackets.

6. The optical fiber splice case according to claim 1, wherein said second side of said dividing wall includes a pair of posts adapted for connecting a splicing tray thereto.

7. The optical fiber splice case according to claim 1, wherein said enclosure base further includes a lower and an upper sealing ring for mating engagement with a first and a second gasket contained within said first and said second cover members.

8. The optical fiber splice case according to claim 1, wherein at least one of said fiber ports includes a fiber adapter connected thereto.

9. The optical fiber splice case according to claim 8, wherein each said fiber adapter includes a first and a second o-ring, said first o-ring adapted for selectively sealing a dust cover against said fiber adapter, said second o-ring adapted for sealing said fiber adapter against said bulkhead member.

10. The optical fiber splice case according to claim 9, wherein each said fiber adapter includes a fiber connector for connecting to a fiber jumper.

11. The optical fiber splice case according to claim 1, wherein at least one of said cover members include an air valve therethrough.

12. The optical fiber splice case according to claim 1, wherein at least one of said cover members being hingedly engaged with said enclosure base.

13. The optical fiber splice case according to claim 12, wherein said plurality of optic fiber ports each include a passageway adapted to receive a drop wire therethrough.

14. The optical fiber splice case according to claim 13, wherein said hingedly engaged cover member includes a drop wire seal for sealing said plurality of optical fiber ports.

15. An optical fiber splice case comprising:
an enclosure base having an outer flange portion extending around said enclosure base includes a dividing wall having a splicing tray attached thereto;
said enclosure base further includes an adapter bulkhead member having a plurality of optical fiber ports adapted to selectively sealingly receive drop wires;
said drop wire connected to a fiber connector;
said fiber connector and said splicing tray include a fiber jumper therebetween and;
a pair of cover members, each said cover member being contoured to selectively sealingly engage an opposing side of said outer flange of said enclosure base for providing access to one of a drop chamber and a splicing chamber.

16. A method of providing a fiber optic connection to a plurality of end users, comprising the steps of:
providing an optical fiber splice case having an enclosure base with an outer flange portion extending therearound, said enclosure base including a selectively sealable cover member engaged with said outer flange for accessing a splicing chamber and an end plate;
providing said splice case with a bulkhead having a plurality of optical fiber ports therethrough;
opening said cover member and installing a feeder cable between said end plate and said bulkhead in said splicing chamber;
connecting said feeder cable to a selected number of fiber jumpers;
connecting said selected number of fiber jumpers to a selected number of fiber connectors;
closing said cover member; and
attaching a selected number of drop wires to said selected number of fiber connectors;
providing said splice case with a plurality of fiber adaptors:
removing a selected number of dust covers from selected said fiber adapters to expose said selected number of fiber connectors; and
opening another selectively sealed cover member for accessing a drop chamber opposed to and distinct from said splicing chamber.

17. The method of providing a fiber optic connection according to claim 16, further including the step of providing said selected number of drop wires with hardened connectors.

18. The method of providing a fiber optic connection according to claim 17, further including the step of providing said hardened connectors with threaded caps for mating engagement with said selected number of fiber connectors.

19. A method of making an optical fiber splice case, comprising the steps of:
    providing a double sided enclosure base having two chambers and a splicing tray in one of said chambers, each said side of said base having an outer flange portion extending therearound;
    providing an end plate and an adapter bulkhead with a plurality of fiber adapters and a plurality of feeder cable ports;
    said fiber adapters include fiber connectors;
    connecting said fiber connectors, on one side of said bulkhead, with said splicing tray via a plurality of fiber jumpers;
    installing a plurality of dust covers, on the other side of said bulkhead, to said fiber adapters;
    enclosing and sealing said chambers with a pair of cover members each selectively sealingly engaged with said outer flange of a side of said enclosure base; and
    one of said pair of cover members selectively enclosing and sealing one of said chambers and another of said pair of cover members selectively enclosing and sealing another of said chambers wherein each said chamber is distinct and independently accessed.

20. The method of making an optical fiber splice case according to claim 19, further including the step of selectively sealing said feeder cable ports with a plurality of plugs.

21. The method of making a splice case according to claim 19, further including the step of providing an air valve through said bulkhead to allow for pressurization and to check sealing integrity of said chambers.

22. An optical fiber splice case comprising:
    an enclosure base including an outer flange portion extending around said enclosure base, and a dividing wall having, on one side, a splicing tray attached thereto and on the other side, a connector plate attached thereto;
    first and second cover members being selectively sealingly engaged with opposing sides of said outer flange portion of said enclosure base, said first and said second cover members each extending along the length of said outer flange portion of said enclosure base;
    said enclosure base further including a bulkhead member having a plurality of fiber ports therethrough adapted to receive a plurality of fiber drops;
    said connector plate including a plurality of fiber connectors adapted to receive terminal ends of said plurality of fiber drops; and,
    said bulkhead member including at least one passageway adapted to receive a part of a feeder cable extending therethrough.

* * * * *